US010166740B2

(12) United States Patent
Johnson et al.

(10) Patent No.: US 10,166,740 B2
(45) Date of Patent: Jan. 1, 2019

(54) METHODS OF FORMING METALLIC GLASS MULTILAYERS

(71) Applicant: Glassimetal Technology, Inc., Pasadena, CA (US)

(72) Inventors: William L. Johnson, San Marino, CA (US); Marios D. Demetriou, West Hollywood, CA (US); Joseph P. Schramm, Sierra Madre, CA (US)

(73) Assignees: Glassimetal Technology, Inc., Pasadena, CA (US); Apple Inc., Cupertino, CA (US)

( * ) Notice: Subject to any disclaimer, the term of this patent is extended or adjusted under 35 U.S.C. 154(b) by 455 days.

(21) Appl. No.: 14/808,885

(22) Filed: Jul. 24, 2015

(65) Prior Publication Data

US 2016/0023438 A1 Jan. 28, 2016
US 2017/0028682 A9 Feb. 2, 2017

Related U.S. Application Data

(60) Provisional application No. 62/028,676, filed on Jul. 24, 2014.

(51) Int. Cl.
*B32B 15/01* (2006.01)
*B32B 7/02* (2006.01)
*C21D 6/00* (2006.01)
*C22C 1/00* (2006.01)
*C22C 45/00* (2006.01)
*C22C 45/02* (2006.01)
*C22C 45/04* (2006.01)
*C22C 45/10* (2006.01)
*C22F 1/08* (2006.01)
*C22F 1/10* (2006.01)
*C22F 1/18* (2006.01)
*B22D 27/20* (2006.01)
*B22D 23/00* (2006.01)
*B22D 25/06* (2006.01)
*C22C 33/00* (2006.01)
*B33Y 10/00* (2015.01)
*B33Y 80/00* (2015.01)
*B33Y 70/00* (2015.01)

(52) U.S. Cl.
CPC ............ *B32B 15/01* (2013.01); *B22D 23/003* (2013.01); *B22D 25/06* (2013.01); *B22D 27/20* (2013.01); *B32B 7/02* (2013.01); *B32B 15/015* (2013.01); *B32B 15/018* (2013.01); *C21D 6/00* (2013.01); *C22C 1/002* (2013.01); *C22C 33/003* (2013.01); *C22C 45/00* (2013.01); *C22C 45/001* (2013.01); *C22C 45/003* (2013.01); *C22C 45/02* (2013.01); *C22C 45/04* (2013.01); *C22C 45/10* (2013.01); *C22F 1/08* (2013.01); *C22F 1/10* (2013.01); *C22F 1/186* (2013.01); *B33Y 10/00* (2014.12); *B33Y 70/00* (2014.12); *B33Y 80/00* (2014.12)

(58) Field of Classification Search
CPC ...... B22D 23/003; B22D 25/06; B22D 27/20; B32B 7/02; B32B 15/01; B32B 15/05; B32B 15/018; C21D 6/00; C22C 1/002; C22C 33/003; C22C 45/00; C22C 45/001; C22C 45/003; C22C 45/02; C22C 45/04; C22C 45/10; C22F 1/08; C22F 1/10; C22F 1/186
See application file for complete search history.

(56) References Cited

U.S. PATENT DOCUMENTS

| 4,290,476 A | 9/1981 | Smith |
| 8,052,923 B2 | 11/2011 | Langlet |
| 8,485,245 B1 | 7/2013 | Prest et al. |
| 2003/0183310 A1 | 10/2003 | McRae |
| 2013/0306198 A1 | 11/2013 | Prest et al. |
| 2013/0309121 A1 | 11/2013 | Prest et al. |
| 2014/0202595 A1 | 6/2014 | Hofmann |
| 2015/0090371 A1 | 4/2015 | Demetriou et al. |

FOREIGN PATENT DOCUMENTS

| JP | 60-137552 | 7/1985 |
| JP | 62-183944 | 8/1987 |
| JP | H04 198436 | 7/1992 |
| WO | WO 2013/089651 | 6/2013 |

OTHER PUBLICATIONS

S. Ding et al., "Wetting of Metallic Glass Forming Liquids on Metals and Ceramics," Journal of Applied Physics, vol. 245, Issue 110, 043508 (2011).
F. Incropera and D.P. DeWitt, "Fundamentals of heat and Mass Transfer", 3rd Edition, 1990, p. 262.
U.S. Appl. No. 15/085,614, filed Mar. 30, 2016, Demetriou et al.
Pond et al., "A Method of Producing Rapidly Solidified Filamentary Castings," *Transactions of the Metallurgical Society of AIME*, 1969, vol. 245, No. 11, pp. 2475.
M.D. Demetriou et al., "A damage-tolerant glass," *Nature Materials*, 2011 vol. 10, pp. 123-128.
Chen et al., "A Rapid Quenching Technique for the Preparation of Thin Uniform Films of Amorphous Solids," *Review of Scientific Instruments*, 1970, vol. 41, No. 8, pp. 1237-1238.
S. Pauly et al., "Processing Metallic Glasses by Selective Laser Melting," *Materials Today*, vol. 16, pp. 37-41 (2013).
Y.J. Kim et al., "Experimental determination of the time-temperature-transformation diagram of the undercooled liquid $Zr_{41.2}Ti_{13.8}Cu_{12.5}Ni_{10}Be_{22.5}$ alloy using containerless electrostatic levitation processing", *Appl. Phys. Lett.*, 68, 1057-1059 (1996).

(Continued)

*Primary Examiner* — Edward J Cain
(74) *Attorney, Agent, or Firm* — Polsinelli PC

(57) ABSTRACT

The disclosure is directed to methods of forming metallic glass multilayers by depositing a liquid layer of a metallic glass forming alloy over a metallic glass layer, and to multilayered metallic glass articles produced using such methods.

22 Claims, 13 Drawing Sheets

(56) References Cited

OTHER PUBLICATIONS

S. Pogatscher et al., "In-Situ Probing of Metallic Glass Formation and Crystallization upon Heating and Cooling via Fast Differential Scanning Calorimetry", *Appl. Phys. Lett.* 104, 251908 (2014).
V.K. Balla et al., "Laser Processing of Fe-based Bulk Amorphous Alloy", *Surface & Coatings Technology,* 205, 2661-2667 (2010).
G. Yang et al., "Laser Solid Forming of Zr-Based Bulk Metallic Glass," *Intermetallics* 22, 110-115 (2012).
J.-Y. Suh et al., Novel Thermoplastic Bonding Using a Metallic Glass Solder, *Scripta Materialia* 59, 905-908 (2008).
J.G. Wang et al., "Diffusion Bonding of a Zr-based Metallic Glass in its Supercooled Liquid Region", *Intermetallics* 46, 236-242 (2014).
J. Schroer et al., "Pronounced asymmetry in the crystallization behavior during constant heating and cooling of a bulk metallic glass-forming liquid", *Phys. Rev. B.* 60, 11855 (1999).

METHODS OF FORMING METALLIC GLASS MULTILAYERS

CROSS-REFERENCE TO RELATED APPLICATIONS

The present application claims the benefit under 35 U.S.C. § 119(e) of U.S. Provisional Patent Application No. 62/028,676, entitled "Methods of Sequential Liquid Layer Deposition of Metallic Glasses," filed on Jul. 24, 2014, which is incorporated herein by reference in its entirety.

FIELD

The disclosure is directed to methods of forming metallic glass multilayers via layer-by-layer deposition of liquid layers of metallic glass-forming alloys, and articles produced using such methods.

BACKGROUND

Additive manufacturing typically refers to the production of 3D metal articles via layer-by-layer deposition. A few methods for additive manufacturing of metallic glass 3D articles currently exist. Most of these methods involve melting of powders by means of a radiation beam.

One method uses a Laser Engineered Net Shaping (LENS) process (see for example B. Zheng, Y. Zhou, J. E. Smugeresky, and E. J Lavernia, "Processing and Behavior of Fe-Based Metallic Glass Components via Laser-Engineered Net Shaping", Metallurgical and Materials Transactions 40A, 1235-1245 (2009), and V. K. Balla and A. Bandyopadhyay, "Laser Processing of Fe-based Bulk Amorphous Alloy", Surface & Coatings Technology 205, 2661-2667 (2010), the references of which are incorporated herein in their entirety). In this approach, a flowing stream of metallic glass powder is deposited locally on a molten pool over a substrate created by a focused laser beam and metallurgically bonds to the substrate. Applying this approach point-by-point, line-by-line, and layer-by-layer, a 3D article may be built.

Another method uses a Selective Laser Melting (SLM) process (see for example U.S. Pat. No. 8,052,923, and G. Yang, X, Lin, F. Liu, Q. Hu, L. Ma, J. Li, and W. Huang, "Laser Solid Forming of Zr-Based Bulk Metallic Glass," Intermetallics 22, 110-115 (2012) and S. Pauly, L. Lober, R. Petters, M. Stoica, S. Scudino, U. Kuhn and J. Eckert, "Processing Metallic Glasses by Selective Laser Melting," Materials Today 16, 37-41 (2013), the references of which are incorporated herein in their entirety). In this approach, a powder layer, deposited on a substrate, is locally melted by a focused laser, and subsequently is locally rapidly solidified. Again, applying this approach point-by-point, line-by-line, and layer-by-layer, a 3D article may be built.

These approaches have several drawbacks. These include the use of fine powders that can introduce a plurality of bonding surfaces. Having multiple bonding surfaces in turn can promote porosity. Moreover, any oxide layers on the powder surfaces may inhibit bonding and can introduce oxide inclusions into the final article such that the final article may be prone to crystallization or cracking, thereby having diminished glass forming ability and mechanical performance. Another drawback is the use of radiation heating, which can promote uneven heating from particulate to particulate and may render the management of heat very inefficient.

U.S. Patent Publication Nos. 2013/0306198 and 2014/0202595 disclose additive manufacturing methods for metallic glasses based on layer-by-layer deposition, which involves successive deposition of an added liquid layer to a base metallic glass layer. Both applications involve methods where the added liquid layer is deposited as droplets (i.e. as a spray). Publication No. 2013/0306198 also mentions the possibility of the liquid layer being deposited as a continuous stream. In both applications, the methods include cooling each added layer sufficiently fast to form a metallic glass. However, the applications do not disclose how to promote wetting between the added liquid layer and base metallic glass layer, or how to avoid crystallization of the base metallic glass layer due to heating by conduction with the added liquid layer.

Developing an additive manufacturing method capable of producing 3D metallic glass articles with properties that are substantially similar to a monolithic material is of technological importance.

BRIEF SUMMARY

The disclosure is directed to methods of forming metallic glass multilayers by depositing a liquid layer over a metallic glass layer, and to multilayered metallic glass articles produced using such methods.

In other embodiments, the disclosure is directed to methods of forming metallic glass multilayers by depositing a molten layer of a metallic glass forming alloy over a metallic glass layer, where the thickness $d_i$ and initial temperature $T_i$ of the molten layer and the thickness $d_o$ and initial temperature $T_o$ of the metallic glass layer produce an interface temperature $T_s$ that is at least as high as the glass transition temperature of the metallic glass $T_g$, where the characteristic cooling rate of the molten layer, given by $\alpha_i \pi^2 (T_i - T_s)/4d_i^2$, where $\alpha_i = 3 \times 10^{-6}$ m²/s, is greater than the critical cooling rate of the metallic glass forming alloy, and where the characteristic time scale of the metallic glass layer following the deposition process, given by $4d_o^2/\alpha_o \pi^2$, where $\alpha_o = 3 \times 10^{-6}$ m²/s, is shorter than the time for the metallic glass to crystallize at the interface temperature $T_s$.

In another embodiment, $\alpha_i$ is the thermal diffusivity of the molten metallic glass forming alloy measured experimentally at any temperature between $T_i$ and $T_g$.

In another embodiment, $\alpha_i$ is the thermal diffusivity of the molten metallic glass forming alloy measured experimentally at any temperature between $T_L$ and $T_g$, where $T_L$ is the liquidus temperature of the metallic glass forming alloy.

In another embodiment, $\alpha_i$ is the thermal diffusivity of the molten metallic glass forming alloy measured experimentally at a temperature halfway between $T_i$ and $T_g$.

In another embodiment, $\alpha_i$ is the thermal diffusivity of the molten metallic glass forming alloy measured experimentally at a temperature halfway between $T_L$ and $T_g$.

In another embodiment, $\alpha_o$ is the thermal diffusivity of the metallic glass measured experimentally at any temperature between $T_o$ and $T_g$.

In another embodiment, $\alpha_o$ is the thermal diffusivity of the metallic glass measured experimentally at any temperature between room temperature and $T_g$.

In another embodiment, $\alpha_o$ is the thermal diffusivity of the metallic glass measured experimentally at a temperature halfway between $T_o$ and $T_g$.

In another embodiment, $\alpha_o$ is the thermal diffusivity of the metallic glass measured experimentally at a temperature halfway between room temperature and $T_g$.

In another embodiment, the interface temperature $T_s$ is at least 25° C. higher than $T_g$.

In another embodiment, the cooling rate in the molten layer following the deposition process is given by $\alpha_i\pi^2(T_i-T_s)/4d_i^2$, and where the cooling rate is at least twice as high as the critical cooling rate of the metallic glass forming alloy.

In another embodiment, the characteristic time scale of the molten layer following the deposition process is given by $[(T_L-T_n)/(T_i-T_s)][4d_i^2/\alpha_i\pi^2]$, where $T_n$ is the crystallization nose temperature of the metallic glass forming alloy, and where the characteristic time scale is shorter than the crystallization nose time of the metallic glass forming alloy.

In another embodiment, the characteristic time scale of the molten layer following the deposition process is given by $[(T_L-T_n)/(T_i-T_s)][4d_i^2/\alpha_i\pi^2]$, and where the characteristic time scale is less than ½ the crystallization nose time of the metallic glass forming alloy.

In another embodiment, the molten layer thickness $d_i$ is less than the maximum thickness given by $(\pi/2)\sqrt{[\alpha_i t_{cn}(T_i-T_s)/0.2T_L]}$, where $t_{cn}$ the crystallization nose time of the metallic glass forming alloy.

In another embodiment, the molten layer thickness $d_i$ is less than ½ of the maximum thickness given by $(\pi/2)\sqrt{[\alpha_i t_{cn}(T_i-T_s)/0.2T_L]}$.

In another embodiment, the molten layer thickness $d_i$ is less than the critical casting thickness of the metallic glass forming alloy.

In another embodiment, the molten layer thickness $d_i$ is less than ½ of the critical casting thickness of the metallic glass forming alloy.

In another embodiment, the molten layer thickness $d_i$ is less than ⅓ of the critical casting thickness of the metallic glass forming alloy.

In another embodiment, the time scale of the metallic glass layer given by $4d_o^2/\alpha_o\pi^2$ is less than ½ of the time for the metallic glass to crystallize at the interface temperature $T_s$.

In another embodiment, the metallic glass layer thickness $d_o$ is less than the maximum thickness given by $(\pi/2)\sqrt{[\alpha_o t_h(T_s)]}$, where $t_h(T_s)$ is the time for the metallic glass to crystallize at the interface temperature $T_s$.

In another embodiment, the metallic glass layer thickness $d_o$ is less than ½ of the maximum thickness given by $(\pi/2)\sqrt{[\alpha_o t_h(T_s)]}$.

In another embodiment, the thickness of the metallic glass layer $d_o$ is less than the thickness given by $d_c(15.59\Delta T_x/\Delta T_L-1.056)$, where $d_c$ is ½ the critical casting thickness of the metallic glass forming alloy, $\Delta T_x$ is the difference between $T_x$ and $T_g$ of the metallic glass and $\Delta T_L$ is the difference between $T_l$ and $T_g$ of the metallic glass forming alloy.

In yet another embodiment, $\Delta T_x$ of the metallic glass is at least 50 K.

In yet another embodiment, $\Delta T_x/\Delta T_L$ of the metallic glass is at least 0.1.

In another embodiment, the interface temperature $T_s$ is measured experimentally.

In another embodiment, the interface temperature $T_s$ is measured by a thermocouple positioned at the interface formed by the two layers.

In another embodiment, the interface temperature $T_s$ is measured by an infrared camera viewing the interface formed by the two layers.

In another embodiment, the interface temperature $T_s$ is measured by a pyrometer pointing at the interface formed by the two layers.

In another embodiment, the interface temperature $T_s$ is determined by the Half Enthalpy criterion.

In another embodiment, the metallic glass multilayer is substantially amorphous.

In another embodiment, the metallic glass multilayer is substantially homogeneous.

In another embodiment, the bending stress of the metallic glass multilayer substantially matches that of a monolithic metallic glass sample having substantially the same geometry.

In another embodiment, the bending strain of the metallic glass multilayer substantially matches that of a monolithic metallic glass sample having substantially the same geometry.

In other embodiments, the method includes at least one successive deposition of a molten layer over a multilayer that comprises at least two layers to form a multilayered metallic glass article.

In other embodiments, the disclosure is directed to a metallic glass multilayer formed according to the disclosed method.

In other embodiments, the disclosure is directed to a method of forming a multilayered metallic glass article by depositing at least one molten layer of a metallic glass forming alloy over at least one metallic glass layer, where the thickness and initial temperature of the at least one molten layer are adjusted such that the layer is cooled sufficiently fast to a temperature below the glass-transition temperature of the metallic glass without inducing substantial crystallization, where the thickness and initial temperature of the at least one metallic glass layer are adjusted such that the layer is heated to a temperature below a temperature where substantial crystallization is induced, and where the metallic glass article is substantially amorphous and substantially homogeneous.

In one embodiment, the metallic glass layer and molten layer are of substantially the same composition.

In another embodiment, the metallic glass layer and molten layer are of substantially the same thickness.

In another embodiment, at least two successive layer depositions are performed.

In another embodiment, at least three successive layer depositions are performed.

In another embodiment, at least four successive layer depositions are performed.

In another embodiment, the temperature of the molten layer is less than the temperature $T_i$ obtained from the "Half-Enthalpy" criterion associated with a maximum interface temperature $T_s$, whereas the maximum interface temperature is determined from the heating TTT diagram associated with a crystallization time $t_h$, whereas the crystallization time $t_h$ is associated with the thickness of the metallic glass layer d according to $t_h=4d^2/\alpha\pi^2$ where $\alpha$ is the metallic glass thermal diffusivity.

In another embodiment, the thickness of the metallic glass layer is less than the thickness d obtained according to $d=\sqrt{(\alpha\pi^2 t_h/4)}$, where $\alpha$ is the metallic glass thermal diffusivity, where $t_h$ is obtained from the heating TTT diagram associated with an interface temperature $T_s$, where $T_s$ is determined from the "Half-Enthalpy" criterion associated with the molten layer temperature $T_i$ being equal to the alloy liquidus temperature $T_L$.

In another embodiment, the thickness of the metallic glass layer is less than the thickness d obtained according to $d=d_c(14.72\Delta T_x/\Delta T_L-0.972)$, where $d_c$ is the critical casting thickness of the metallic glass forming alloy, $\Delta T_x$ is the difference between $T_x$ and $T_g$ and $\Delta T_L$ is the difference between $T_l$ and $T_g$ of the metallic glass forming alloy.

In yet another embodiment, the metallic glass alloy has $\Delta T_x$ of at least 50 K.

In yet another embodiment, the metallic glass alloy has $\Delta T_x/\Delta T_L$ of at least 0.1.

In yet another embodiment, the metallic glass alloy is Zr-based, Ti-based, Al-based, Mg-based, Ce-based, La-based, Y-based, Fe-based, Ni-based, Co-based, Cu-based, Au-based, Pd-based, or Pt-based.

In yet another embodiment, the molten layer is deposited using the shearless melt deposition method.

In yet another embodiment, the molten layer is deposited using the spray deposition method.

In yet another embodiment, the molten layer is deposited using the melt spinning method.

In yet another embodiment, the molten layer is deposited using the planar flow casting method.

In yet another embodiment, the multilayer is laid on a substrate having temperature below the interface temperature.

In yet another embodiment, the multilayer is laid on a substrate having temperature below the glass transition temperature of any of the metallic glass forming alloys.

In yet another embodiment, the multilayer is laid on a substrate having temperature at room temperature.

In yet another embodiment, the substrate comprises a metal.

In yet another embodiment, the substrate comprises copper.

In other embodiments, the disclosure is directed to a multilayered metallic glass article formed by depositing at least one molten layer of a metallic-glass forming alloy over at least one metallic glass layer, where the thickness and initial temperature of the at least one molten layer are adjusted such that the layer is cooled sufficiently fast to a temperature below the glass-transition temperature of the metallic glass without inducing substantial crystallization, where the thickness and initial temperature of the at least one metallic glass layer are adjusted such that the layer is heated to a temperature below a temperature where substantial crystallization is induced, and where the metallic glass article is substantially amorphous and substantially homogeneous.

The disclosure is also directed to methods of forming metallic glass multilayer composites by sequential layer-by-layer deposition, where the multilayered metallic glass composites comprise at least two bonded metallic glass layers, where the at least two layers comprise different metallic glass alloy compositions.

In other embodiments, the disclosure is directed to methods of forming metallic glass multilayer composites by depositing a molten layer of a metallic-glass forming alloy of a first alloy composition over a metallic glass layer of a second alloy composition, where the first composition and second composition are different, where the thickness $d_i$ and initial temperature $T_i$ of the molten layer and the thickness $d_o$ and initial temperature $T_o$ of the metallic glass layer produce an interface temperature $T_s$ that is at least as high as the effective glass transition temperature $T_g^*$, where the characteristic cooling rate of the molten layer is given by $\alpha_i \pi^2 (T_i - T_s)/4d_i^2$, where $\alpha_i = 3 \times 10^{-6}$ m²/s, is greater than the critical cooling rate of the metallic glass forming alloy, where the characteristic time scale in the metallic glass layer following the deposition process given by $4d_o^2/\alpha_o \pi^2$, where $\alpha_o = 3 \times 10^{-6}$ m²/s, is shorter than the time for the metallic glass to crystallize at the interface temperature $T_s$, and where the effective glass transition temperature is given by $T_g^* = 0.5 (T_{g1} + T_{g2})$, where $T_{g1}$ and $T_{g2}$ are the glass transition temperatures of the first alloy composition and second alloy composition, respectively.

In another embodiment, the difference between $T_{g1}$ and $T_{g2}$ is less than 50° C.

In another embodiment, the difference between $T_{L1}$ and $T_{L2}$, where $T_{L1}$ and $T_{L2}$ are the liquidus temperatures of the first alloy composition and the second alloy composition, respectively, is less than 150° C.

In another embodiment, the difference between $T_{x1}$ and $T_{x2}$, where $T_{x1}$ and $T_{x2}$ are the crystallization temperatures of the first alloy composition and the second alloy composition, respectively, is less than 50° C.

The disclosure is also directed to a metallic glass multilayer composite that comprises at least two bonded metallic glass layers, where at least two layers comprise different metallic glass alloy compositions.

In one embodiment, the relative difference between the shear moduli of the first and second metallic glass alloy compositions is at least 2%.

In another embodiment, the difference between the shear moduli of the first and second metallic glass alloy compositions is at least 1 GPa.

In another embodiment, the thickness of each layer does not exceed the plastic zone radius of the metallic glass alloy composition of the layer.

In another embodiment, the layers have an equal thickness, wherein the thickness does not exceed the plastic zone radius of the metallic glass alloy composition having the smallest plastic zone radius.

In another embodiment, the yield strength of the metallic glass multilayer composite is higher than the yield strength of the metallic glass alloy composition having the lowest yield strength.

In another embodiment, the yield strength of the metallic glass multilayer composite is within 20% of the volumetric average between the yield strengths of the constituent metallic glass compositions.

In another embodiment, the fracture toughness of the metallic glass multilayer composite is higher than the fracture toughness of the metallic glass alloy composition having the lowest fracture toughness.

In another embodiment, the fracture toughness of the metallic glass multilayer composite is higher than the arithmetic average of the fracture toughness values of the metallic glass compositions.

In another embodiment, the tensile ductility of the metallic glass multilayer composite is higher than the tensile ductility values of the metallic glass compositions.

In one embodiment, the tensile ductility of the metallic glass multilayer composite is at least 0.1%.

Additional embodiments and features are set forth in part in the description that follows, and in part will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure.

DETAILED DESCRIPTION

Figure 1:
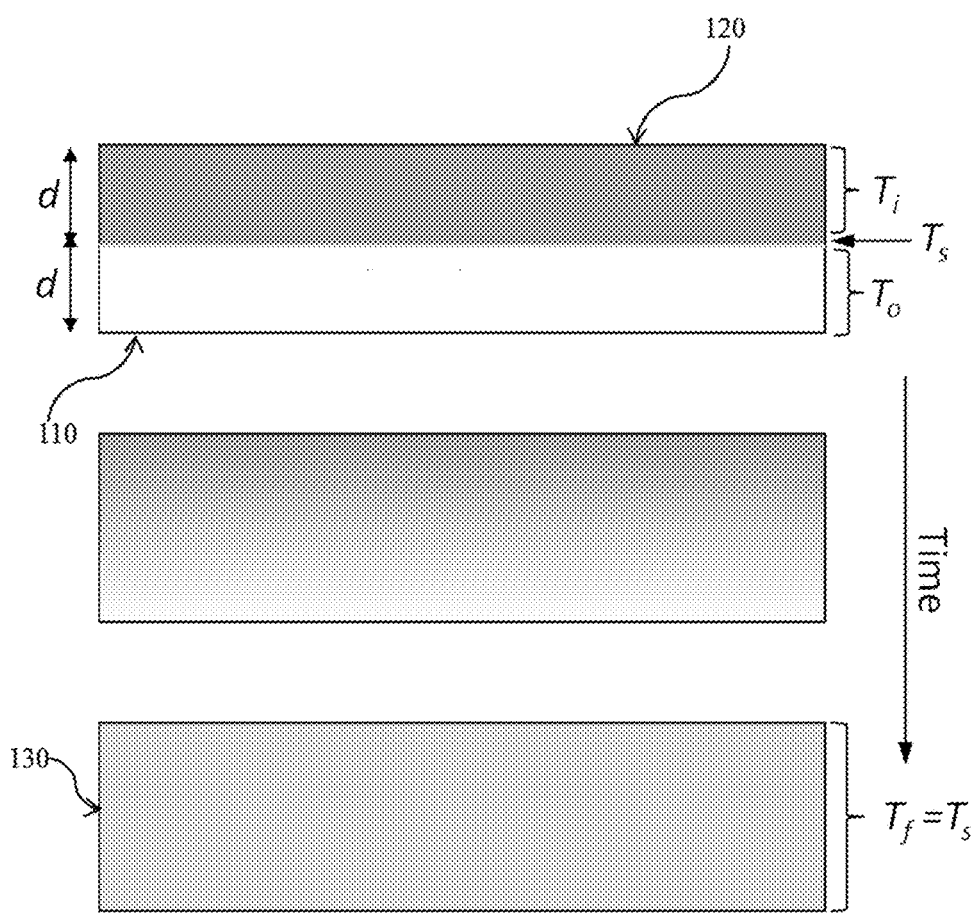
FIG. 1 provides a schematic showing the thermal equilibration of a metallic glass multilayer during layer-by-layer deposition under an adiabatic heat exchange process.

The disclosure is directed to methods for producing metallic glass multilayers by layer-by-layer deposition, where the multilayered metallic glass exhibits substantial interlayer adhesion and mechanical integrity. In the context of this disclosure, a "multilayer" refers to an object that comprises at least two layers. Under suitable processing conditions, the multilayer will exhibit a substantially amorphous structure (substantially free of crystallinity in all layers), a substantially homogeneous structure (substantially free of pores), and mechanical properties such as strength, hardness, fracture toughness, etc., that substantially match those of a monolithic metallic glass.

In some embodiments of the disclosure, an object being substantially amorphous (or substantially free of crystallinity) means that the volume fraction of crystals is less than 1%. In other embodiments it means that the volume fraction of crystals in the object is less than 2.5%, while in yet other embodiments it means that the volume fraction of crystals is less than 5%. In other embodiments of the disclosure, an object being substantially amorphous (or substantially free of crystallinity) means that the volume fraction of crystals in the object is less than the volume fraction detectable by x-ray diffraction. In other embodiments of the disclosure, an object being substantially amorphous (or substantially free of crystallinity) means that the volume fraction of crystals in the object is less than the volume fraction detectable by differential scanning calorimetry.

In some embodiments of the disclosure, an object being substantially homogeneous (or substantially free of pores) means that the volume fraction of pores in the object is less than 0.1%. In other embodiments it means that the volume fraction of pores in the object is less than 0.25%, in yet other embodiments it means that the volume fraction of pores in the object is less than 0.5%, while in yet other embodiments it means that the volume fraction of pores in the object is less than 1%.

In some embodiments of the disclosure, two objects being of substantially the same composition means that the atomic concentration of each of the elements forming the compositions of the objects varies by less than 1% between the objects. In one embodiment, two objects being of substantially the same composition means that the atomic concentration of each of the elements forming the compositions of the objects varies by less than 0.5% between the objects. In another embodiment, two objects being of substantially the same composition means that the atomic concentration of each of the elements forming the compositions of the objects varies by less than 0.25% between the objects.

In some aspects of the disclosure, the layers in the multilayer are substantially bonded such that the bending stress and/or bending strain of the multilayer substantially matches those of a monolithic metallic glass sample having substantially the same geometry (i.e. is within 5% in all dimensions). The bending strength and strain are respectively defined as the maximum stress and strain attained before failure when the sample is subjected to a 3-point bend test. In some embodiments, the bending strength of the multilayer is within 5% of the corresponding property of a monolithic metallic glass. In other embodiments, the bending strength of the multilayer is within 10% of the corresponding property of the monolithic metallic glass. In yet other embodiments, the bending strength of the multilayer is within 20% of the corresponding property of the monolithic metallic glass. In yet other embodiments, the bending strength of the multilayer is within 40% of the corresponding property of the monolithic metallic glass. In some embodiments, the bending strain of the multilayer is within 5% of the corresponding property of a monolithic metallic glass. In other embodiments, the bending strain of the multilayer is within 10% of the corresponding property of the monolithic metallic glass. In yet other embodiments, the bending strain of the multilayer is within 20% of the corresponding property of the monolithic metallic glass. In yet other embodiments, the bending strain of the multilayer is within 40% of the corresponding property of the monolithic metallic glass.

The disclosed method includes forming a metallic glass multilayer by depositing a second layer of hot molten liquid over a previously deposited and quenched first layer of metallic glass without inducing substantial crystallization in either layer while enabling substantial interlayer wetting. In the context of the current disclosure, molten liquid layer refers to a layer of liquid deposited by any means, including without limitation, a continuous liquid or melt stream (e.g. a homogeneous liquid or melt), or a stream of discrete liquid droplets or molten powder particulates (e.g. a spray).

The previously deposited metallic glass layer(s) will heretofore be referred to as the "base layer," and the terms "base layer" and "metallic glass layer" can be used interchangeably to refer to the previously deposited metallic glass layer(s). The newly deposited molten layer will be referred to as the "added layer," and the terms "added layer" and "molten layer" can be used interchangeably to refer to the newly deposited molten layer. A couple formed by an added layer deposited over a base layer will be referred to as the "multilayer." As previously noted, a "multilayer" refers to an object that comprises at least two layers.

Crystallization may be expected if the added layer or any portion thereof is not cooled sufficiently fast to bypass crystallization and form the metallic glass phase. But crystallization may also be expected if the base layer or any portion of it is reheated above its glass transition during the transient deposition period during which the two layers thermally equilibrate. Whether crystallization of the base and added layers occurs during deposition depends on the detailed temperature history of the two layers as the added layer cools and the base layer heats and eventually thermally equilibrate with each other. Without wishing to be limited to a specific mechanism or mode of action, thermal quenching of the added layer to form metallic glass can require that an intimate thermal contact is established with the base layer in order to achieve cooling of the added layer that is sufficiently rapid to prevent crystallization. To ultimately produce multilayered metallic glass articles with substantially amorphous structure and mechanical integrity also requires that the added layer is bonded with the first layer by an intimate metallurgical interface that is free of gaps or areas of poor interlayer adhesion. These interfacial requirements may be satisfied when the molten layer "wets" the initial layer during the transient thermal equilibration time.

The added layer can wet the base layer during deposition to produce a well bonded interface with good thermal contact between the base and added layers. Following its deposition, the added layer is subsequently cooled by heat conduction to the previously deposited base layer(s) by quenching the added layer at a sufficient cooling rate to produce a solidified added layer of metallic glass. During deposition of the added layer, the base layer(s) will undergo a transient heating and cooling cycle upon thermal contact with the hotter added layer. To prevent inducing crystallization of the base layer during this transient heating and cooling cycle, the temperature history of the base layer during deposition of the added layer can be controlled. Accordingly, the initial deposition temperature of the added layer can be below a critical value. A substantially amorphous and coherently bonded metallic glass multilayer can be fabricated when the above conditions of wetting between the layers, sufficient quenching of the added layer, and controlled heating of the base layer are met. By continuing a layer-by-layer sequential deposition while meeting the above conditions, a three dimensional metallic glass articles of desired shape and architecture with substantially amorphous structure and mechanical integrity can be built up. Accordingly, the disclosure in some embodiments provides a method for additive manufacturing of high precision, net shape, three-dimensional metallic glass articles.

In various embodiments of the disclosure, the base and added layers may be of different composition and have different thicknesses. Such embodiments having layers of different composition and/or thickness may be advantageous if one desires a composite multilayered metallic glass utilizing more two or more metallic glass compositions having different properties that are utilized over different thicknesses. In other embodiments of the present invention, the base and added layers are of the same composition and have the same thickness.

Regardless of any variation in the composition or thickness between the multilayer layers, It has now been discovered that to produce an added layer of metallic glass by deposition onto a previously deposited metallic glass base layer(s) without inducing detectable crystallization in either the base or added layer, the temperature history of the layers as the added layer cools and the base layer(s) heat and eventually thermally equilibrate with each other during the deposition process may be controlled in accordance with several criteria, which are presented below in accordance with certain embodiments.

An added layer of thickness d and temperature $T_i$ brought into contact with a base layer at temperature $T_o$ of the same thickness d will thermally equilibrate with time. The process is illustrated in FIG. 1. In the long time limit, the base layer 110 ultimately heats up from initial temperature $T_o$ to final temperature $T_f$, the added layer 120 cools from its initial temperature $T_i$ to the final temperature $T_f$, and the interface temperature also cools from its initial value at $T_s$ to the final temperature $T_f$. When the two layers come into thermal contact (i.e. when wetting occurs) the interface between the layers will instantaneously jump to temperature $T_s$. In the context of this disclosure, the interface temperature $T_s$ refers to the "initial" interface temperature established spontaneously at the interface between the layers immediately following thermal contact (i.e. within 100 milliseconds of thermal contact, and in some embodiments, within 10 millisecond of thermal contact, while in other embodiments, within 1 millisecond of thermal contact). As long as heat loss to the environment is not significant, i.e. the multilayer is substantially insulated from the environment and the process of thermal equilibration between the layers is "adiabatic", the interface temperature may remain at $T_s$ during the heat exchange process between the base and added layers. That is, the base layer surface temperature can rise quickly to $T_s$ upon wetting and can remain there as equilibration between the layers proceeds under adiabatic conditions to create an equilibrated multilayer 130. Hence, under adiabatic conditions, $T_f$ can evolve to be equal to $T_s$ (as shown in FIG. 1). If both layers have the same heat capacity (constant, independent of temperature) the initial interface temperature $T_s$ will be the average of $T_o$ and $T_i$. In such adiabatic process, the transient heat exchange between the two layers conserves total energy so that heat transferred to the base layer at any time is equal to that lost by the added layer. Under adiabatic conditions and assuming heat is transferred entirely by conduction, it is possible to calculate $T_s$ using established heat conduction relationships (see F. Incropera and D. P DeWitt, "Fundamentals of heat and Mass Transfer", $3^{rd}$ Edition, p. 262, the reference of which in incorporated herein in its entirety). But $T_s$ can be in the undercooled liquid region (i.e. at a temperature above the glass-transition temperature) where the material is susceptible to crystallization. Hence under adiabatic conditions where $T_s$ is not changing with time, the material can crystallize.

Figure 2:
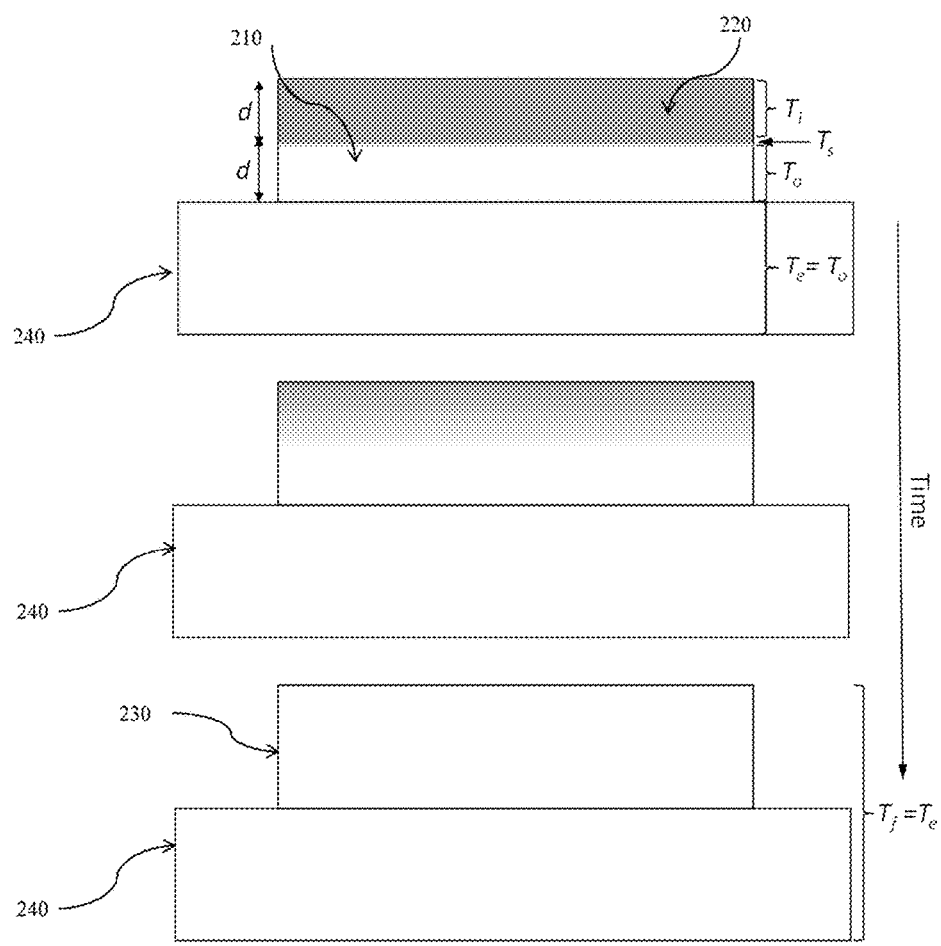
FIG. 2 provides a schematic showing the thermal equilibration of a metallic glass multilayer during layer-by-layer deposition under a non-adiabatic heat exchange process.

To overcome this problem in accordance with embodiments, the multilayer may be exposed to an environment temperature $T_e < T_s$ in order to allow for the multilayer to cool before it crystallizes. In such embodiments, if the environment has a much higher thermal mass than the multilayer, the final multilayer temperature can approximately evolve to the environment temperature, i.e. $T_f \approx T_e$. This condition can be achieved, for example, by having the multilayer laid on a substrate 240 having temperature $T_e < T_s$, as shown in FIG. 2. In this example, the environment (i.e. the substrate) temperature and the base layer initial temperature are equal, i.e. $T_e=T_o$. In the short time limit, the base layer 210 slightly heats up from its initial temperature $T_o$ mostly near the interface as the added layer 220 cools down from its initial temperature $T_i$. In the long time limit however, both layers cool back down equilibrating at the environment (i.e. the substrate) temperature $T_e$ to form the multilayer 230. In some embodiments, it may be advantageous to have $T_e<T_g$, where $T_g$ is the glass transition temperature of the metallic glass forming alloy. In other embodiments, it may be advantageous to have $T_e$ at room temperature. Therefore, in one embodiment of the current disclosure, the multilayer is laid on a substrate of temperature $T_e$, where $T_e<T_s$. In another embodiment, the multilayer is laid on a substrate of temperature $T_e$, where $T_e<T_g$. In another embodiment, the multilayer is laid on a substrate of temperature $T_e$, where $T_e=T_o$. In another embodiment, the multilayer is laid on a substrate of temperature $T_e$, where $T_e$ is room temperature. In yet another embodiment, the substrate comprises a metal. In yet another embodiment, the substrate comprises copper.

In the above embodiments an assumption has been made that the heat capacities of the materials are independent of temperature, however, this is not necessarily the case for a metallic glass and its corresponding liquid (i.e., the metallic glass when heated above its glass transition temperature, $T_g$). The heat capacities of the glass and liquid are generally both temperature dependent and different. For the glass (for $T<T_g$), the specific heat capacity is nearly temperature independent and roughly equal to 3R~25 J/mol-K (where R=8.314 J/mol-K is the gas constant). Above $T_g$, the alloy is liquid and the specific heat capacity jumps (typically by ~20 J/mol-K at the glass transition) and then becomes strongly temperature dependent.

The complexity of the temperature dependence of the heat capacity in the different states of a metallic glass-forming alloy adds to the complexity of working with these materials in a layer-by-layer deposition process. It has now been determined that a relationship between the initial added and base layer temperatures $T_i$ and $T_o$ and the initial interface temperature $T_s$ can be established from an enthalpy balance. As discussed above, if the multilayer is thermally insulated from the environment, i.e. the process of thermal equilibration between the layers is adiabatic, the final equilibrium multilayer temperature $T_f$ can evolve to be equal to the initially established interface temperature $T_s$. For a given $T_i$ and $T_o$, $T_f$ and $T_s$, which are equal to each other under such adiabatic conditions, can be determined from an enthalpy balance. But in a non-adiabatic heat exchange process, where heat exchange between the multilayer and the environment at temperature $T_e$ is allowed (e.g. the multilayer may exchange heat with a cold substrate), $T_f$ is no longer equal to $T_s$ and no longer determined by $T_i$ and $T_o$, as its evolution is determined by $T_e$. The interface temperature $T_s$ however, which is the initial temperature established spontaneously at the interface, is determined solely by $T_i$ and $T_o$ and is independent of whether the process is adiabatic or not. That is, for a given set of $T_i$ and $T_o$, $T_s$ can be the same whether the process is adiabatic or not. As described above, the "initial" interface temperature in some embodiments can be established within 100 milliseconds of thermal contact, in other embodiments, within 10 millisecond of thermal contact, while in other embodiments, within 1 millisecond of thermal contact spontaneously at the interface between the layers immediately following thermal contact.

It has now been determined that for a metallic glass layer-by-layer deposition process as disclosed in the present embodiments, being able to determine $T_s$ for a given $T_i$ and $T_o$ is of importance, as it represents the highest temperature that the base layer can reach independent of whether the process is adiabatic or non-adiabatic. In the context of this disclosure, embodiments of an enthalpy balance approach are disclosed that enables the determination of $T_s$ for a given $T_i$ and $T_o$. The disclosed enthalpy balance approach assumes an adiabatic heat exchange process among the layers, however, the determined $T_s$ value for the given $T_i$ and $T_o$ values can also represent the $T_s$ value for the same $T_i$ and $T_o$ values if the process were non-adiabatic.

In some embodiments of the enthalpy balance approach, any heat exchange with the environment is disregarded (i.e. an adiabatic heat exchange process among the layers is assumed). In such embodiments, the interface temperature of a multilayer consisting of a base and an added layer having equal thickness depends on the enthalpy of the two layers being equal in equilibrium. The excess enthalpy of the added layer at $T_i$ compared with the enthalpy of the base layer at $T_o$ will be divided equally between the two layers following equilibration. In such embodiments of the enthalpy balance, for layers of substantially equal thickness, $T_s$ is simply the temperature for which the enthalpy of the added layer $H_L$ at $T_s$ becomes half its initial value at $T_i$ In the context of this disclosure, this condition is termed the "Half Enthalpy" criterion.

Embodiments that allow for the determination of the enthalpy as a function of temperature for a metallic glass in the both glass and liquid phases may therefore be used in determining $T_s$. Such enthalpy functions of temperature may be determined for a specific metallic glass alloy composition using calorimetry. Such data is available in the literature for certain metallic glass alloys. However, for metallic glass alloys of interest that such data is not available, calorimetric measurements may be performed to determine the temperature dependent enthalpy functions. Here embodiments of methods are provided that allow for approximate but fairly accurate determination of the enthalpies of metallic glass alloys without the need to perform calorimetric measurements. The methods according to these embodiments are based on dimensionless functions that can approximately estimate the enthalpies of any specific metallic glass alloy.

The universal enthalpy functions disclosed herein arise from recognizing that metallic glass forming alloys demonstrate an enthalpy of melting (i.e. latent heat of melting) that is approximately equal to $RT_L$ (where $T_L$ is in units of Kelvin), and that metallic glass forming alloys demonstrate linear temperature dependence of enthalpy below $T_g$ (i.e. in the glass phase) and a 1/T temperature dependence above $T_g$ (i.e. in the liquid phase). The embodiments also identify that at $T_L$, the difference between the enthalpy of the liquid and the hypothetical (extrapolated) enthalpy of the glass is approximately between 0.7 $RT_L$ and 0.8$RT_L$, depending on the fragility of the glass former. Specifically, the higher the fragility of the glass former, the higher the fraction of $RT_L$. In some embodiments, glass formers with fragilities between 40 and 50 may be assumed to have a difference between the enthalpy of the liquid and the hypothetical (extrapolated) enthalpy of the glass of approximately between 0.7 $RT_L$ and 0.75$RT_L$, while in glass formers with fragilities between 50 and 60, the difference between the enthalpy of the liquid and the hypothetical (extrapolated) enthalpy of the glass is approximately between 0.75$RT_L$ and 0.8$RT_L$. Accordingly, in embodiments of the method of determining the enthalpy relation of a metallic glass with temperature, the difference between the enthalpy of the liquid and the hypothetical (extrapolated) enthalpy of the glass is approximately $0.75RT_L$.

In accordance with embodiments, by normalizing the temperature T with the liquidus temperature $T_L$ (in units of Kelvin) and the enthalpy H with $RT_L$, a dimensionless universal enthalpy relation with temperature can be given by the following function between the normalized enthalpy and normalized temperature:

$$H/RT_L = 3(T/T_L - T_r/T_L) \text{ for } T/T_L < T_g/T_L \qquad \text{Eq. (1)}$$

$$H/RT_L = 3(T/T_L - T_r/T_L) + c[(T_g/T_L)^{-1} - (T/T_L)^{-1}] \text{ for } T/T_L > T_g/T_L \qquad \text{Eq. (2)}$$

where c is a constant given by $c = 3T_g/4(T_L - T_g)$ (i.e. satisfying the requirement that $H/RT_L - 3(1 - T_r/T_L) = \frac{3}{4}$ at $T/T_L = 1$), and $T_r$ is the reference temperature where the normalized enthalpy is taken to be zero. The reference temperature $T_r$ is arbitrary, and can be taken to be the base layer temperature $T_o$.

Therefore, in accordance with embodiments, an enthalpy function for any given metallic glass may be determined by Eqs. (1) and (2) above, provided one knows $T_g$ and $T_L$ for the specific metallic glass alloy along with $T_o$. Accordingly, in such embodiments, enthalpy functions of temperature for the metallic glass and undercooled liquid phases may be constructed. For illustrative purposes, $T_o$ is assumed to be at 300 K (i.e. at about room temperature) in the below examples. In one example, the enthalpy function for a metallic glass having $T_g = 650$ K and $T_L = 1100$ K, which yields a constant c of 1.08, is presented in FIG. 3. In another example, the enthalpy function for a metallic glass having $T_g = 400$ K and $T_L = 650$ K, which yields a constant c of 1.2, is presented in FIG. 4.

Figure 3:
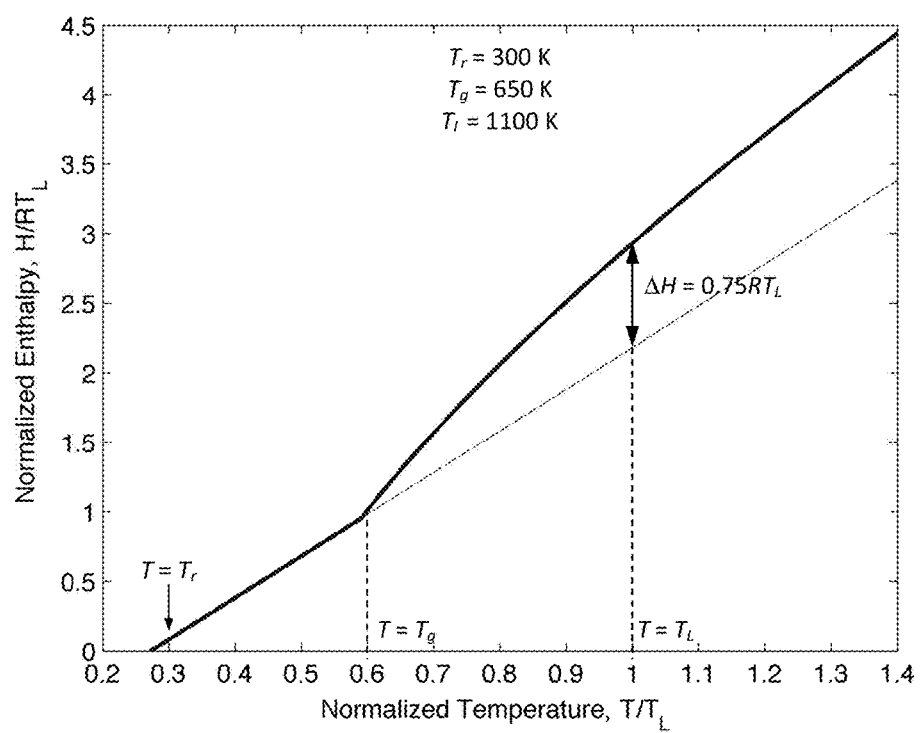
FIG. 3 provides a plot of the normalized enthalpy vs. normalized temperature for a metallic glass having $T_g=650$ K, $T_L=1100$ K and where $T_r=300$ K.
Figure 4:
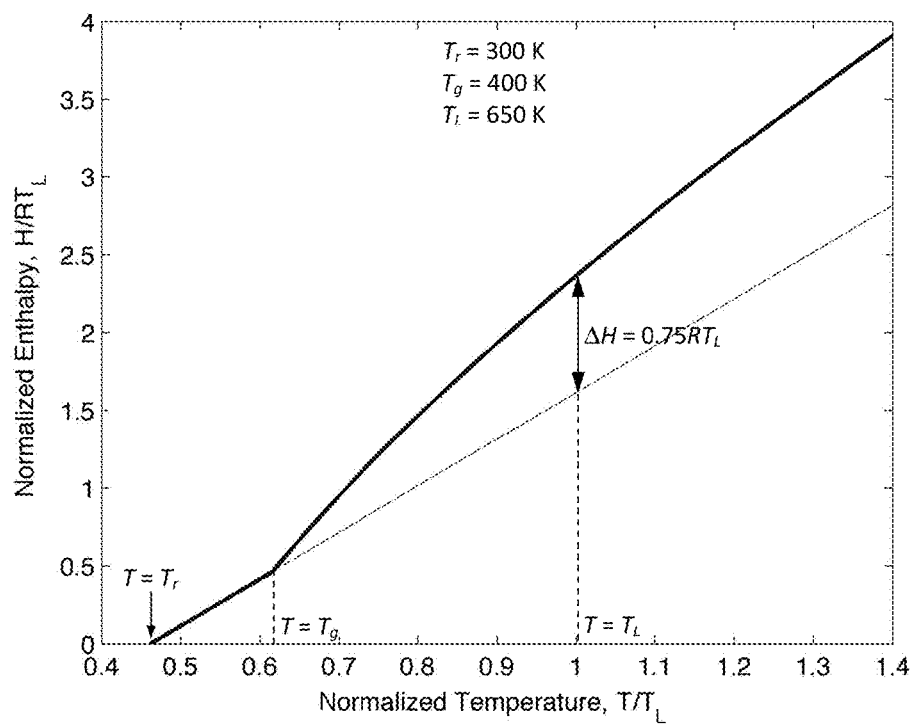
FIG. 4 provides a plot of the normalized enthalpy vs. normalized temperature for a metallic glass having $T_g=400$ K, $T_L=650$ K and where $T_r=300$ K.
Figure 5:
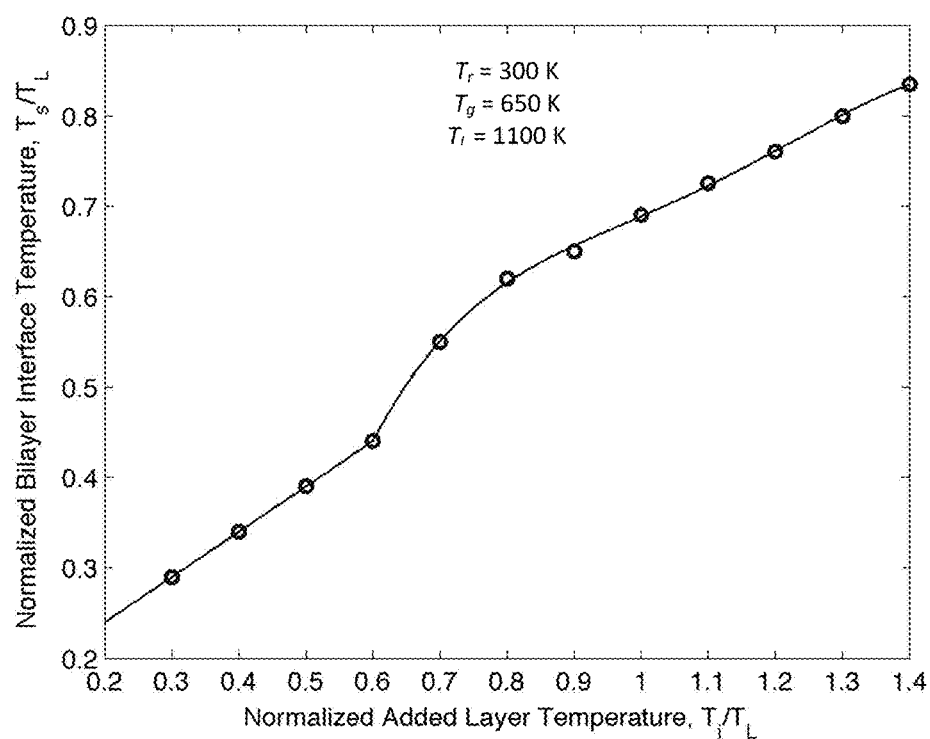
FIG. 5 provides a plot of the normalized multilayer interface temperature vs. the normalized added layer temperature for layer-by-layer deposition for a metallic glass having $T_g=650$ K, $T_L=1100$ K and where $T_r=300$ K.
Figure 6:
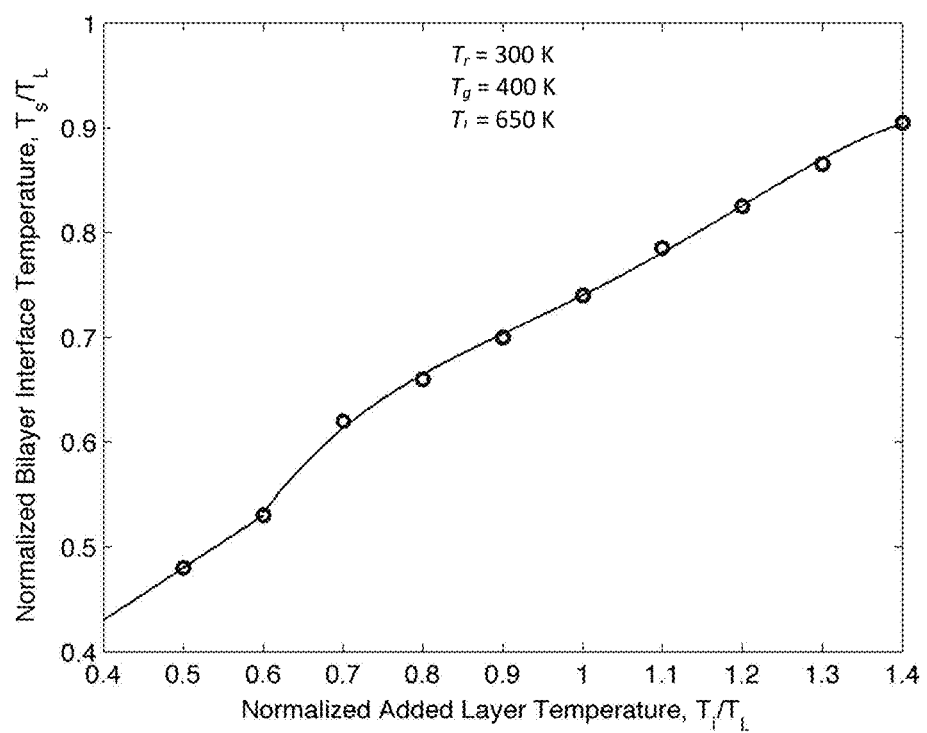
FIG. 6 provides a plot of the normalized multilayer interface temperature vs. the normalized added layer temperature for layer-by-layer deposition for a metallic glass having $T_g=400$ K, $T_L=650$ K and where $T_r=300$ K.

Using embodiments of the enthalpy vs. temperature curve as shown in FIGS. 3 and 4, it is possible, according to embodiments, to determine the interface temperature $T_s$ for each alloy given the initial added layer temperature $T_i$ using embodiments of the "Half Enthalpy" methodology presented above. Specifically, in such embodiments for a given added layer temperature $T_i$, it is possible to determine the added layer enthalpy using the enthalpy function as in FIGS. 3 and 4, and then determine $T_s$ as the temperature corresponding to half the enthalpy of the added layer enthalpy. For example, using data from FIGS. 3 and 4, the interface temperature $T_s$ is determined for various values of the initial added-layer temperature $T_i$ as described above. In FIGS. 5 and 6, the interface temperature $T_s$ is plotted against the initial added-layer temperature $T_i$, both normalized by $T_L$, where $T_L$ equals 1100K or 650K for the two alloys of FIGS. 5 and 6 respectively. In this exemplary embodiment, the greater heat capacity of the liquid in the added layer implies that the interface temperature $T_s$ will be closer to initial temperature of the added layer $T_i$ than to the base layer $T_o$.

Therefore, according to embodiments of the disclosure, one may construct a plot of an "Half-Enthalpy" criterion for a given metallic glass alloy, like those in FIGS. 5 and 6, provided that an enthalpy function like those in FIGS. 3 and 4 are first constructed, as described by Eqs. (1) and (2). Alternatively, one may directly evaluate the enthalpy function of a metallic glass alloy by measuring its specific heat using calorimetry.

Criterion for Achieving Wetting at the Interface

The wetting of a copper surface by a glass-forming metallic liquid was studied by Suh et. al. (J.-Y. Suh, B. Lohwongwatana, C. M. Garland, R. D. Conner, W. L. Johnson, and D. Suh, "Novel Thermoplastic Bonding Using a Metallic Glass Solder, Scripta Materialia 59, 905-908 (2008), the reference of which is incorporated herein in its entirety). Specifically, they studied the wetting of a copper substrate by a bulk metallic glass alloy above its $T_g$ and below its crystallization temperature $T_x$ under an applied normal load. It was found that for temperatures of about 60-70° C. above $T_g$, wetting occurred within a time scale of about 1 minute when an applied pressure of about 1 MPa is used to achieve contact. More generally, it is known that metallic glass surfaces favor wettability by other liquid alloys (e.g. solders). Wetting of two layers of the same metallic glass above $T_g$ under a normal load has also been demonstrated (J. G. Wang, J. C. Fan, Y. F. Zhang, G. Wang, W. H. Wang, and K. C. Chan, "Diffusion Bonding of a Zr-based Metallic Glass in its Supercooled Liquid Region", Intermetallics 46, 236-242 (2014)).

Despite this general knowledge about how metallic glasses may wet substrates of disparate metals or other liquid alloys, less is known about how to achieve consistent wetting between a metallic glass base layer and an added layer of a metallic glass forming liquid. It has now been determined that the contact between a metallic glass and a metallic glass forming liquid can result in rapid wetting (i.e. in a time scale of about 1 s or less) when the liquid/glass interfacial temperature $T_s$ exceeds $T_g$ by an amount sufficient to enable local atomic rearrangement at the interface. Therefore, in embodiments the criterion to achieve intimate contact and wetting may be governed by the following condition:

$$T_s > T_g \qquad \text{Eq. (3)}$$

In short, rapid wetting can occur at a wetting temperature $T_w$ that is about 50-100° C. above $T_g$. At higher temperatures, wetting may be essentially "spontaneous" (i.e. occur over a fraction of a second, and in some embodiments, under 100 millisecond) upon establishing surface contact, occurring over durations of under 1 s, and in some embodiments under 0.1 s. In embodiments, wetting may require some minimum applied pressure $P_{min}$ (typically 0.1 MPa or more) required to ensure contact at the interface. In other embodiments both the wetting temperature $T_w$ and minimum required pressure $P_{min}$ may be determined experimentally for a given metallic glass forming alloy.

In particular, the interface temperature $T_s$ is experimentally accessible. In some embodiments, $T_s$ can be measured by placing a thermocouple at the interface between the added and base layers, and record the temperature following the deposition process.

In the disclosure, wetting may be considered a sufficient criterion for establishing intimate thermal contact of the base and added layers. Upon adding a liquid layer at temperature $T_i$ to a base layer at temperature $T_o$, one can determine the interface temperature upon wetting, $T_s$ by using the plot in FIG. 4. In some embodiments of the disclosure, the interface temperature of the multilayer $T_s$ is at least at $T_g$ in order to achieve wetting between the two layers. In other embodiments of the disclosure, the interface temperature of the multilayer is at least 25° C. above $T_g$ in order to achieve wetting between the two layers. In other embodiments of the disclosure, the interface temperature of the multilayer is at least 50° C. above $T_g$ in order to achieve wetting between the two layers. In yet other embodiments of the disclosure, the interface temperature of the multilayer is at least 100° C. above $T_g$ in order to achieve wetting between the two layers.

Criteria for Avoiding Crystallization of the Layers

In accordance with embodiments, conditions for avoiding crystallization in the base layer during addition of an added layer may be formulated for any combination of metallic glasses. Upon adding a liquid layer at temperature $T_i$ to a base layer at temperature $T_o$, it is possible, according to embodiments, to determine the interface temperature upon wetting, $T_s$ by using the methods described above, an exemplary embodiment of which is provided in the plot in FIG. 4. This interface temperature is established upon contact. The temperature profile within the liquid and base layer will subsequently evolve as illustrated in the exemplary embodiments provided in FIGS. 1 and 2. According to embodiments, to prevent crystallization in either the base or added layer, the time-temperature history of the base layer near the interface is prevented from crossing the Time-Temperature-Transformation (TTT) diagram for crystallization during the enthalpy exchange process, i.e. during cooling of the added layer or during heating of the base layer and during eventual equilibration of both layers to $T_f$. The TTT diagrams associated with heating the glass phase or cooling the liquid phase are generally experimentally accessible for metallic glass alloy compositions by means of calorimetry, where the time to crystallize during isothermal holding at a given temperature is marked by a detectable enthalpy release known as recalescence.

Added Layer: The TTT diagram of a metallic glass forming alloy during cooling from an equilibrium liquid state (i.e. at or above $T_L$), representing the crystallization time $t_c$ as a function of temperature, $t_c(T)$, is known to exhibit a "C"-shape curve, characterized by the "nose" time $t_{cn}$, which is the minimum time for crystallization, and the "nose" temperature $T_n$ associated with $t_{cn}$. Generally, for metallic glass-forming alloys the longer $t_{cn}$ is the better the glass former.

According to embodiments, to avoid crystallizing the added layer, the thickness of the added layer d and its initial temperature $T_i$ are selected such that the cooling rate of the added layer during the enthalpy exchange process is higher than the "critical cooling rate" required to bypass $t_{cn}$. Specifically, the cooling rate R during cooling of an added layer of thickness $d_i$ from its initial temperature $T_i$ to the nose temperature $T_n$ is approximately given by the leading term of the solution to the Fourier heat flow equation:

$$R = \alpha_i \pi^2 (T_i - T_s)/4d_i^2 \qquad \text{Eq. (4)}$$

Where $\alpha_i$ is the thermal diffusivity of the metallic glass forming liquid, and $T_s$ is the interface temperature of the multilayer, which in this analysis is assumed to be lower than $T_n$. On the other hand, the critical cooling rate $R_c$ to bypass $t_{cn}$ is given by:

$$R_c = (T_L - T_n)/t_{cn} \qquad \text{Eq. (5)}$$

Therefore, the criterion for bypassing crystallization, according to embodiments is governed by the following condition:

$$[(T_L - T_n)/(T_i - T_s)][4d_i^2/\alpha_i \pi^2] < t_{cn} \qquad \text{Eq. (6)}$$

Typically, the "nose" temperature $T_n$ of most metallic glass-forming alloys is approximately $0.8 T_L$ (where $T_L$ is in units of Kelvin). Since $t_{cn}$ is unique for a given metallic glass alloy and $\alpha_i$ is a measurable property that is either known for the specific metallic glass forming liquid or can be determined experimentally, the above criterion can be met by determining the maximum thickness for which Eq. (6) is satisfied. According to embodiments, substituting $T_n = 0.8 T_L$ into Eq. (6) and solving for $d_i$ one can determine the maximum added layer thickness to avoid crystallization in the added layer, as follows:

$$d_i < (\pi/2)\sqrt{[\alpha_i t_{cn}(T_i - T_s)/0.2 T_L]} = d_c \qquad \text{Eq. (7)}$$

This maximum thickness will be denoted as $d_c$.

In accordance with still other embodiments, Eq. (7) can be used to estimate the maximum thickness $d_c$ for an added layer for a given $T_i$ and $T_s$ in order to avoid crystallization. Specifically, variables $\alpha_i$ and $t_{cn}(T)$ are experimentally accessible properties of the metallic glass forming liquid, while variable $T_s$ may be determined for a given $T_i$ by using the "Half Enthalpy" criterion as in the plots of FIGS. 5 and 6. Therefore, provided that $\alpha_i$ and $t_{cn}(T)$ are known and $T_s$ is determined in accordance with embodiments, d may be adjusted to be below $d_c$ such that the criterion for bypassing crystallization in the added layer given by Eq. (7) is satisfied.

This maximum thickness $d_c$ could also related to the "critical casting thickness", which is a measure of the largest lateral dimension that can be formed with the amorphous phase by quenching the alloy from the equilibrium liquid state (i.e. at or above $T_L$), and quantifies the glass forming ability of a given alloy. Specifically, for a given alloy, $d_c$ may be approximately ½ of the critical casting thickness. The critical casting thickness for a given alloy is typically evaluated by quenching experiments, and is independent of the evaluation of the TTT diagram, which is typically performed by calorimetry. Therefore, for alloys where the TTT diagram on cooling has not been evaluated and $t_{cn}$ is not known but the critical casting thickness is known, $d_c$ can be taken as ½ of the critical casting thickness.

Figure 7:
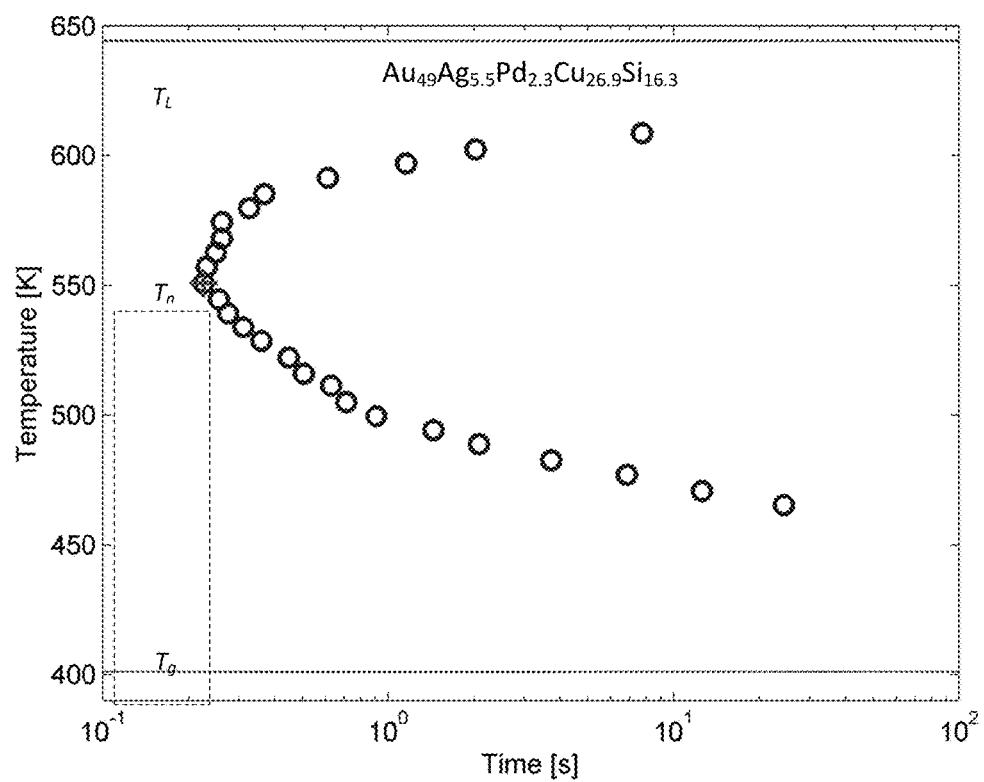
FIG. 7 provides a TTT diagram associated with cooling from the equilibrium liquid state for example metallic glass forming alloy $Au_{49}Ag_{5.5}Pd_{2.3}Cu_{26.9}Si_{16.3}$.

The TTT diagram, for example, for metallic glass forming alloy $Au_{49}Ag_{5.5}Pd_{2.3}Cu_{26.9}Si_{16.3}$ during cooling from the equilibrium liquid state (i.e. at or above $T_L$) is presented in FIG. 7 (data taken from S. Pogatscher, P. J. Uggowitzer, and J. F. Loffler, "In-Situ Probing of Metallic Glass Formation and Crystallization upon Heating and Cooling via Fast Differential Scanning calorimetry", *Appl. Phys. Lett.* 104, 251908 (2014), the reference of which is incorporated herein in its entirety). The glass transition and liquidus temperatures $T_g$ and $T_L$ of 401 K and 644 K, respectively, are plotted by dotted lines. The nose time and nose temperature $t_{cn}$ and $T_n$ of 0.23 s and 551 K are also indicated in the plot.

In embodiments of the disclosure, the cooling rate in the added layer, given by Eq. (4), is higher than the critical cooling rate of the metallic glass forming alloy. In one embodiment, the cooling rate in the added layer, given by Eq. (4), is at least twice as high as the critical cooling rate of the metallic glass forming alloy. In another embodiment, the cooling rate in the added layer, given by Eq. (4), is at least three times as high as the critical cooling rate of the metallic glass forming alloy. In another embodiment, the cooling rate in the added layer, given by Eq. (4), is at least four times as high as the critical cooling rate of the metallic glass forming alloy. In another embodiment, the cooling rate in the added layer, given by Eq. (4), is at least five times as high as the critical cooling rate of the metallic glass forming alloy.

In other embodiments of the disclosure, the time scale $[(T_L - T_n)/(T_i - T_s)][4d_i^2/\alpha_i \pi^2]$ given by the expression of Eq. (6) is shorter than the crystallization nose time of the metallic glass forming alloy, $t_{cn}$. In another embodiment, the time scale $[(T_L - T_n)/(T_i - T_s)][4d_i^2/\alpha_i \pi^2]$ given by the expression of Eq. (6) is less than ½ the crystallization nose time of the metallic glass forming alloy, $t_{cn}$. In another embodiment, the time scale $[(T_L - T_n)/(T_i - T_s)][4d_i^2/\alpha_i \pi^2]$ given by the expression of Eq. (6) is less than ⅓ the crystallization nose time of the metallic glass forming alloy, $t_{cn}$. In another embodiment, the time scale $[(T_L - T_n)/(T_i - T_s)][4d_i^2/\alpha_i \pi^2]$ given by the expression of Eq. (6) is less than ¼ the crystallization nose time of the metallic glass forming alloy, $t_{cn}$. In another embodiment, the time scale $[(T_L - T_n)/(T_i -$ $T_s)][4d_i^2/\alpha_i\pi^2]$ given by the expression of Eq. (6) is less than ⅕ the crystallization nose time of the metallic glass forming alloy, $t_{cn}$.

In other embodiments of the disclosure, the added layer thickness $d_i$ is less than the maximum thickness $d_c=(\pi/2)\sqrt{[\alpha_i t_{cn}(T_i-T_s)/0.2T_L]}$ given by the expression of Eq. (7). In one embodiment, the added layer thickness $d_i$ is less than ½ of the maximum thickness $d_c=(\pi/2)\sqrt{[\alpha_i t_{cn}(T_i-T_s)/0.2T_L]}$ given by the expression of Eq. (7). In another embodiment, the added layer thickness $d_i$ is less than ⅓ of the maximum thickness $d_c=(\pi/2)\sqrt{[\alpha_i t_{cn}(T_i-T_s)/0.2T_L]}$ given by the expression of Eq. (7). In another embodiment, the added layer thickness $d_i$ is less than ¼ of the maximum thickness $d_c=(\pi/2)\sqrt{[\alpha_i t_{cn}(T_i-T_s)/0.2T_L]}$ given by the expression of Eq. (7). In another embodiment, the added layer thickness $d_i$ is less than ⅕ of the maximum thickness $d_c=(\pi/2)\sqrt{[\alpha_i t_{cn}(T_i-T_s)/0.2T_L]}$ given by the expression of Eq. (7).

In other embodiments of the disclosure, the added layer thickness $d_i$ is less than ½ the critical casting thickness of the metallic glass forming alloy. In one embodiment, the added layer thickness $d_i$ is less than ⅓ the critical casting thickness of the metallic glass forming alloy. In another embodiment, the added layer thickness $d_i$ is less than ¼ the critical casting thickness of the metallic glass forming alloy. In another embodiment, the added layer thickness $d_i$ is less than ⅕ the critical casting thickness of the metallic glass forming alloy.

As discussed above, the thermal diffusivity of the molten metallic glass forming alloy, $\alpha_i$, is an experimentally accessible property of the material and is known for certain alloys, while it can be measured for other alloys of choice using established measurement methods and standards. The thermal diffusivity is not expected to vary much with temperature in the undercooled molten region, i.e. between $T_g$ and $T_L$. Therefore, in one embodiment of the disclosure, $\alpha_i$ is the thermal diffusivity of the molten metallic glass forming alloy measured experimentally at any temperature between $T_i$ and $T_g$. In another embodiment, $\alpha_i$ is the thermal diffusivity of the molten metallic glass forming alloy measured experimentally at any temperature between $T_L$ and $T_g$. In another embodiment, $\alpha_i$ is the thermal diffusivity of the molten metallic glass forming alloy measured experimentally at a temperature halfway between $T_i$ and $T_g$. In another embodiment, $\alpha_i$ is the thermal diffusivity of the molten metallic glass forming alloy measured experimentally at a temperature halfway between $T_L$ and $T_g$. The thermal diffusivity in the molten state $\alpha_i$ also does not vary much between metallic glass forming alloys. Generally for most metallic glass forming alloys, $\alpha_i$ is in the range of $1\times10^{-6}$ m²/s to $5\times10^{-6}$ m²/s, and more specifically in the range of $2\times10^{-6}$ m²/s to $4\times10^{-6}$ m²/s. Therefore, in some embodiments of the disclosure it can be assumed that $\alpha_i=3\times10^{-6}$ m²/s.

Base Layer: In still other embodiments, to prevent crystallization in the base layer, the time-temperature history of the base layer near the interface can be prevented from crossing the TTT-diagram during heating of the base layer as well as during eventual cooling to $T_f$. Unlike the TTT on cooling of a metallic glass-forming liquid, which exhibits a clear "C" shape, the TTT diagram on heating of a metallic glass is nearly monotonic. That is, the "nose" of the TTT diagram on heating typically appears at temperatures much higher that are near $T_L$, and as such, the time for crystallization appears to decrease monotonically with increasing temperature above $T_g$. Therefore, unlike the case of cooling of a metallic glass-forming liquid, a unique critical time for crystallization may not exist in the case of heating a metallic glass, as the crystallization time decreases approximately monotonically with increasing temperature.

In the context of the disclosure, it will be assumed that the crystallization time $t_h$ is a monotonically decreasing function of temperature T, i.e. $t_h(T)$, and can be determined from the TTT-diagram associated with heating of the metallic glass from low temperature into the undercooled liquid above $T_g$. Because $t_h$ decreases monotonically with temperature and because the highest base layer temperature should be $T_s$, the $t_h$ value of interest is that at $T_s$, i.e. $t_h(T_s)$. Specifically, the heating rate $R_h$ during heating of a base layer of initial temperature $T_o$ and thickness $d_o$, after depositing an added layer of higher initial temperature onto it is approximately given by the leading term of the solution to the Fourier heat flow equation:

$$R=\alpha_o\pi^2(T_s-T_o)/4d_o^2 \qquad \text{Eq. (8)}$$

Where $\alpha_i$ is the thermal diffusivity of the metallic glass, and $T_s$ is the interface temperature of the multilayer. On the other hand, the critical heating rate $R_h$ to bypass $t_h(T_s)$ is given by:

$$R_h=(T_s-T_o)/t_h(T_s) \qquad \text{Eq. (9)}$$

Therefore, in accordance with embodiments the criterion for bypassing crystallization is governed by the following condition:

$$4d_o^2/\alpha_o\pi^2<t_h(T_s) \qquad \text{Eq. (10)}$$

In accordance with other embodiments, the maximum base layer thickness $d_o$ to avoid crystallization in the base layer can then be determined as follows:

$$d_o<(\pi/2)\sqrt{[\alpha_o t_h(T_s)]}\equiv d_h \qquad \text{Eq. (11)}$$

This maximum thickness will be denoted as $d_h$.

Accordingly, in embodiments, Eq. (11) can be used to estimate the maximum thickness $d_h$ for an added layer for a given $T_i$ and $T_s$ in order to avoid crystallization. Specifically, variables $\alpha_o$ and $t_h(T)$ are experimentally accessible properties of the metallic glass forming liquid, while variable $T_s$ may be determined for a given $T_i$ by using the "Half Enthalpy" criterion described in embodiments and as exemplified in the plots of FIGS. 5 and 6. Therefore, according to embodiments, provided that $\alpha_o$ and $t_h(T)$ are known and $T_s$ is determined, d may be adjusted to be less than $d_h$ such that the criterion for bypassing crystallization in the added layer given by Eq. (11) is satisfied.

Figure 8:
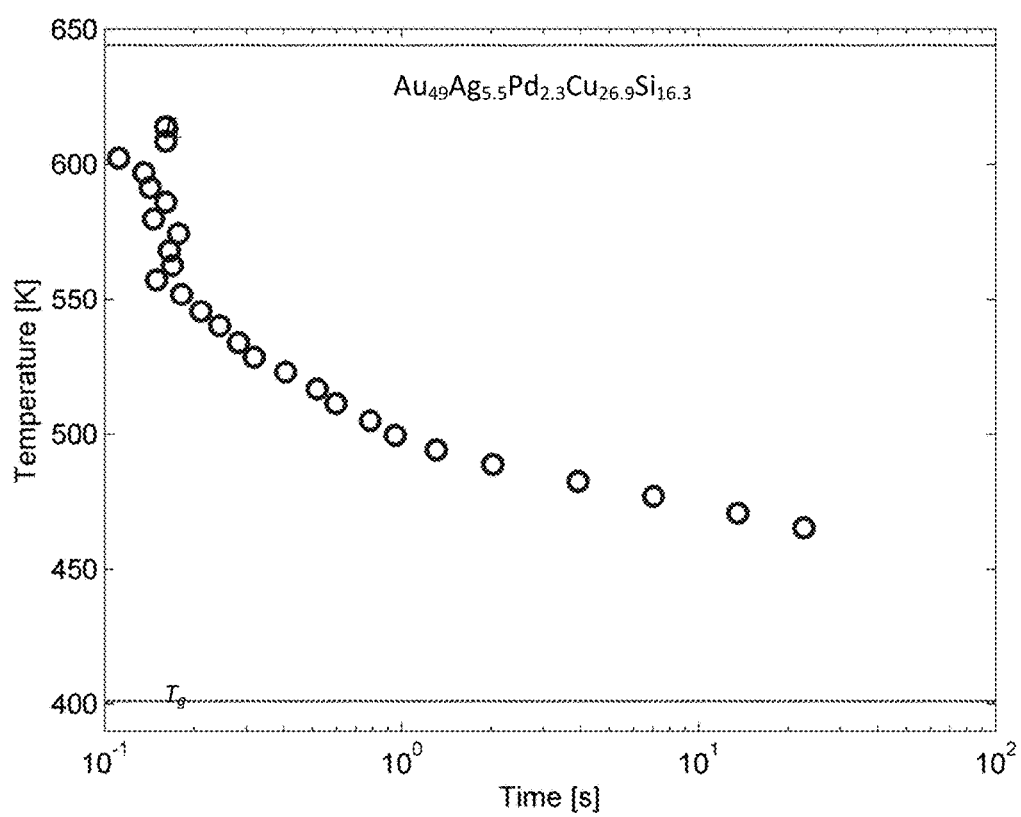
FIG. 8 provides a TTT diagram associated with heating from the glass state for example metallic glass forming alloy $Au_{49}Ag_{5.5}Pd_{2.3}Cu_{26.9}Si_{16.3}$.

The TTT diagram, for example, for metallic glass forming alloy $Au_{49}Ag_{5.5}Pd_{2.3}Cu_{26.9}Si_{16.3}$ during heating from the glass state into the supercooled liquid state (i.e. between $T_g$ and $T_L$) is presented in FIG. 8 (data taken from S. Pogatscher, P. J. Uggowitzer, and J. F. Loffler, "In-Situ Probing of Metallic Glass Formation and Crystallization upon Heating and Cooling via Fast Differential Scanning calorimetry", *Appl. Phys. Lett.* 104, 251908 (2014), the reference of which is incorporated herein in its entirety). The glass transition and liquidus temperatures $T_g$ and $T_L$ of 401 K and 644 K, respectively, are plotted by dotted lines.

In embodiments of the disclosure, the time scale $4d_o^2/\alpha_o\pi^2$ in the base layer given by Eq. (10) is shorter than the time for the metallic glass to crystallize when heated at the interface temperature $T_s$. In one embodiment, the time scale $4d_o^2/\alpha_o\pi^2$ in the base layer given by Eq. (10) is less than ½ than the time for the metallic glass to crystallize when heated at the interface temperature $T_s$. In another embodiment, the time scale $4d_o^2/\alpha_o\pi^2$ in the base layer given by Eq. (10) is less than ⅓ than the time for the metallic glass to crystallize when heated at the interface temperature $T_s$. In another embodiment, the time scale $4d_o^2/\alpha_o\pi^2$ in the base layer given by Eq. (10) is less than ¼ than the time for the metallic glass to crystallize when heated at the interface temperature $T_s$.

In other embodiments of the disclosure, the base layer thickness d is less than the thickness $d_h=(\pi/2)\sqrt{[\alpha_o t_h(T_s)]}$ given by the expression of Eq. (11). In one embodiment, the base layer thickness d is less than ½ the thickness $d_h=(\pi/2)\sqrt{[\alpha_o t_h(T_s)]}$ given by the expression of Eq. (11). In another embodiment, the base layer thickness d is less than ⅓ the thickness $d_h=(\pi/2)\sqrt{[\alpha_o t_h(T_s)]}$ given by the expression of Eq. (11). In another embodiment, the base layer thickness d is less than ¼ the thickness $d_h=(\pi/2)\sqrt{[\alpha_o t_h(T_s)]}$ given by the expression of Eq. (11).

In general, for a given metallic glass alloy at any temperature Tin the supercooled/undercooled liquid state (i.e. between $T_g$ and $T_l$), the crystallization time upon cooling from the equilibrium liquid state $t_c(T)$ is equal to or greater than the crystallization time upon heating from the glass state $t_h(T)$. This can be observed by comparing the TTT diagrams, for example for metallic glass forming alloy $Au_{49}Ag_{5.5}Pd_{2.3}Cu_{26.9}Si_{16.3}$ for cooling and heating, presented in FIGS. 7 and 8. As seen in FIGS. 7 and 8, $t_h(T)$ is about equal to $t_c(T)$ in the temperature range below about 500 K, while in the temperature range above 500 K $t_h(T)$ is shorter than $t_c(T)$, and is considerably shorter in the temperature range above 550 K by about a factor of 2 or more. This is known as the cooling/heating asymmetry in metallic glass formers (see J. Schroers, W. L. Johnson, and R. Busch, "Pronounced asymmetry in the crystallization behavior during constant heating and cooling of a bulk metallic glass-forming liquid", *Phys. Rev. B.* 60, 11855 (1999), the reference of which is incorporated herein in its entirety).

Accordingly, in embodiments, if $T_s$ is a relatively high temperature in the undercooled region (i.e. is closer to $T_L$ than $T_g$), the criterion given by Eq. (9) for bypassing crystallization in the base layer may be more stringent than that of Eq. (6) for bypassing crystallization in the added layer. Hence, if $T_s$ is a relatively high temperature in the undercooled region, the criterion of Eq. (11) may be the limiting criterion. In such cases, the layer more susceptible to crystallization during layer-by-layer deposition of metallic glasses may be the base layer (provided that the layers are of the same composition and have the same thickness).

On the other hand, if $T_s$ is a relatively low temperature in the undercooled region (i.e. is closer to $T_g$ than $T_l$), the criterion given by Eq. (7) for bypassing crystallization in the added layer may be more stringent than that of Eq. (11) for bypassing crystallization in the base layer. Hence, if $T_s$ is a relatively low temperature in the undercooled region, the criterion of Eq. (7) may be the limiting criterion. In such cases, the layer more susceptible to crystallization during layer-by-layer deposition of metallic glasses may be the added layer (provided that the layers are of the same composition and have the same thickness).

As discussed above, the thermal diffusivity of the metallic glass, $\alpha_o$, is an experimentally accessible property of the material and is known for certain alloys, while it can be measured for other alloys of choice using established measurement methods and standards. The thermal diffusivity is not expected to vary much with temperature in the glass phase region, i.e. between room temperature and $T_g$. Therefore, in one embodiment of the disclosure, $\alpha_o$ is the thermal diffusivity of the metallic glass measured experimentally at any temperature between $T_o$ and $T_g$. In another embodiment, $\alpha_o$ is the thermal diffusivity of the metallic glass measured experimentally at any temperature between room temperature and $T_g$. In another embodiment, $\alpha_o$ is the thermal diffusivity of the molten metallic glass forming alloy measured experimentally at a temperature halfway between $T_o$ and $T_g$. In another embodiment, $\alpha_o$ is the thermal diffusivity of the molten metallic glass forming alloy measured experimentally at a temperature halfway between room temperature and $T_g$. The thermal diffusivity in the metallic glass phase $\alpha_o$ also does not vary much between metallic glass alloys. Generally for most metallic glass alloys, $\alpha_o$ is in the range of $1 \times 10^{-6}$ m²/s to $5 \times 10^{-6}$ m²/s, and more specifically in the range of $2 \times 10^{-6}$ m²/s to $4 \times 10^{-6}$ m²/s. Therefore, in some embodiments of the disclosure it can be assumed that $a'_i = 3 \times 10^{-6}$ m²/s.

Exemplary Alloy Systems: The ability of five different metallic glass alloys to be processed into multilayers by successive layer deposition without crystallizing according to embodiments of the current disclosure is investigated. Exemplary embodiments of the deposition of an added liquid layer at temperature $T_i$, over a metallic glass base layer at room temperature of the same composition and same thickness are provided. In this case study, the layers are assumed to have the same composition and thickness. It is also assumed that the critical condition to avoid crystallization of the multilayer during the deposition process is to avoid crystallization of the base layer, as given by Eq. (10).

Firstly, the lower limit in the added layer temperature $T_i$ for each metallic glass alloy such that crystallization in the base layer is avoided for a fixed layer thickness is determined. A thickness of 1 mm is considered for both layers (i.e. $d_i = d_o = 1$ mm), and the base layer temperature is taken to be $T_o = 300$ K, i.e. approximately room temperature. The thermal diffusivity of all metallic glass alloys considered here both in the molten state as well as in the glass phase (i.e. $\alpha_i$ and $\alpha_o$) is assumed to be $3 \times 10^{-6}$ m²/s. According to Eq. (10), in order to avoid crystallizing a base layer of 1 mm thickness, the heated metallic glass should be capable of resisting crystallization for at least 0.135 s, i.e. $t_h > 0.135$ s.

Ni-based Metallic Glasses: The TTT-diagrams on heating two Ni-based metallic glasses having compositions $Ni_{68.17}Cr_{8.65}Nb_{2.98}P_{16.92}B_{3.28}$ and $Ni_{71.4}Cr_{5.52}Nb_{3.38}P_{16.67}B_{3.03}$ are presented in FIG. 9. The experimental TTT data are fitted using power-law functions. Data for $T_g$ and $T_L$ for each alloy are presented in Table 1 below. Although the two Ni-based metallic glasses have similar compositions, their stability against crystallization is considerably different. Specifically, metallic glass $Ni_{68.17}Cr_{8.65}Nh_{2.98}P_{16.92}B_{3.28}$ appears to be much more stable against crystallization than $Ni_{71.4}Cr_{5.52}Nb_{3.38}P_{16.67}B_{3.03}$, as the time to crystallize at any given temperature in the supercooled liquid region is considerably longer for $Ni_{68.17}Cr_{8.65}Nh_{2.98}P_{16.92}B_{3.28}$. From FIG. 9, the temperature associated with the crystallization time of $t_h = 0.135$ s in $Ni_{68.17}Cr_{8.65}Nh_{2.98}P_{16.92}B_{3.28}$ is 920 K, while that in $Ni_{71.4}Cr_{5.52}Nb_{3.38}P_{16.67}B_{3.03}$ is only 753 K. These characteristic temperatures represent the upper limit in the interface temperature $T_s$ for each metallic glass in order to prevent crystallization during the layer deposition process. Since the two alloys have $T_g$ of about 650 K and $T_L$ of about 1100 K, and since $T_o$ is at 300 K, the enthalpy function of FIG. 3 is approximately valid, and thus the plot corresponding to the "Half Enthalpy" criterion of FIG. 5 can be used to determine the upper limit in $T_i$ associated with the upper limit in $T_s$ for each metallic glass. From FIG. 5, the upper limit in $T_i$ in $Ni_{68.17}Cr_{8.65}Nb_{2.98}P_{16.92}B_{3.28}$ having an upper limit in $T_s$ of 920 K is 1486 K. The upper limit in $T_i$ in $Ni_{71.4}Cr_{5.52}Nb_{3.38}P_{16.67}B_{3.03}$ having an upper limit in $T_s$ of 753 K is only 1002 K, which is below its $T_L$. These results are summarized in Table 1. The implication of these results is that $Ni_{68.17}Cr_{8.65}Nb_{2.98}P_{16.92}B_{3.28}$, being more stable against crystallization, has a higher upper limit in the added layer temperature $T_i$ than that of $Ni_{71.4}Cr_{5.52}Nb_{3.38}P_{16.67}B_{3.03}$, which is less stable against crystallization and therefore the added layer should be confined to temperatures below its $T_L$ to avoid crystallization of the base layer. This is rather limiting, as below $T_L$ the liquid is already unstable against crystallization.

Figure 10:
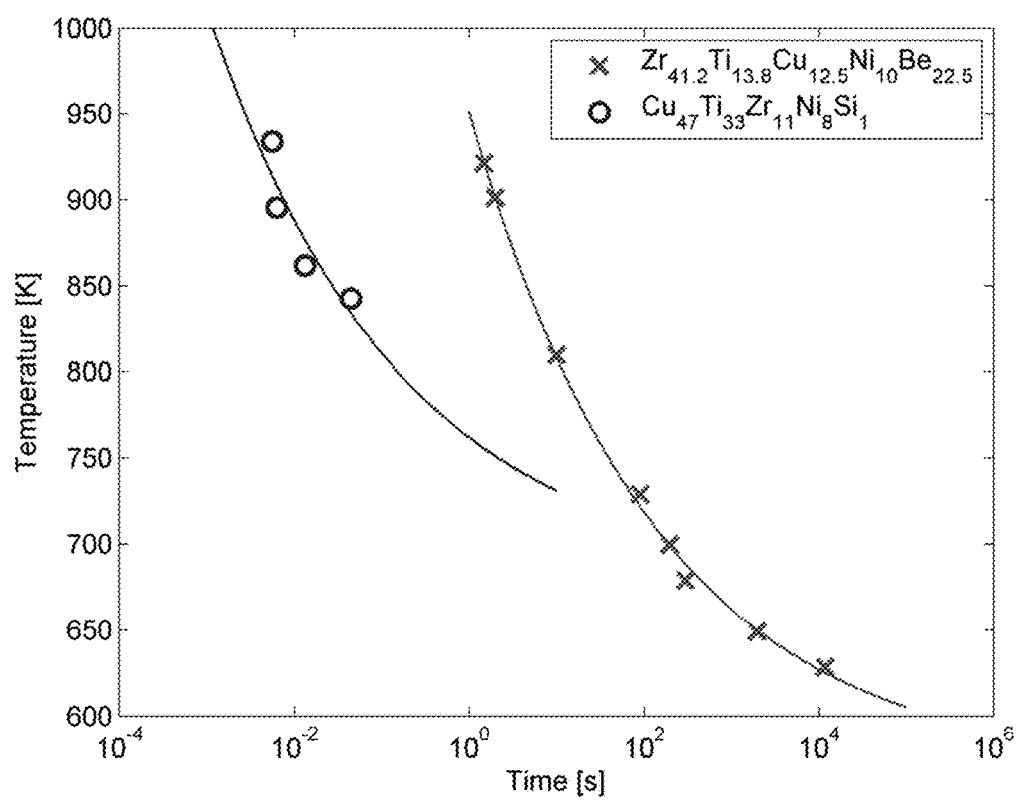
FIG. 10 provides TTT diagrams associated with heating from the glass state for $Zr_{41.2}Ti_{13.8}Cu_{12.5}Ni_{10}Be_{22.5}$ and $Cu_{47}Ti_{33}Zr_{11}Ni_8Si_1$ metallic glass forming alloys.
Figure 11:
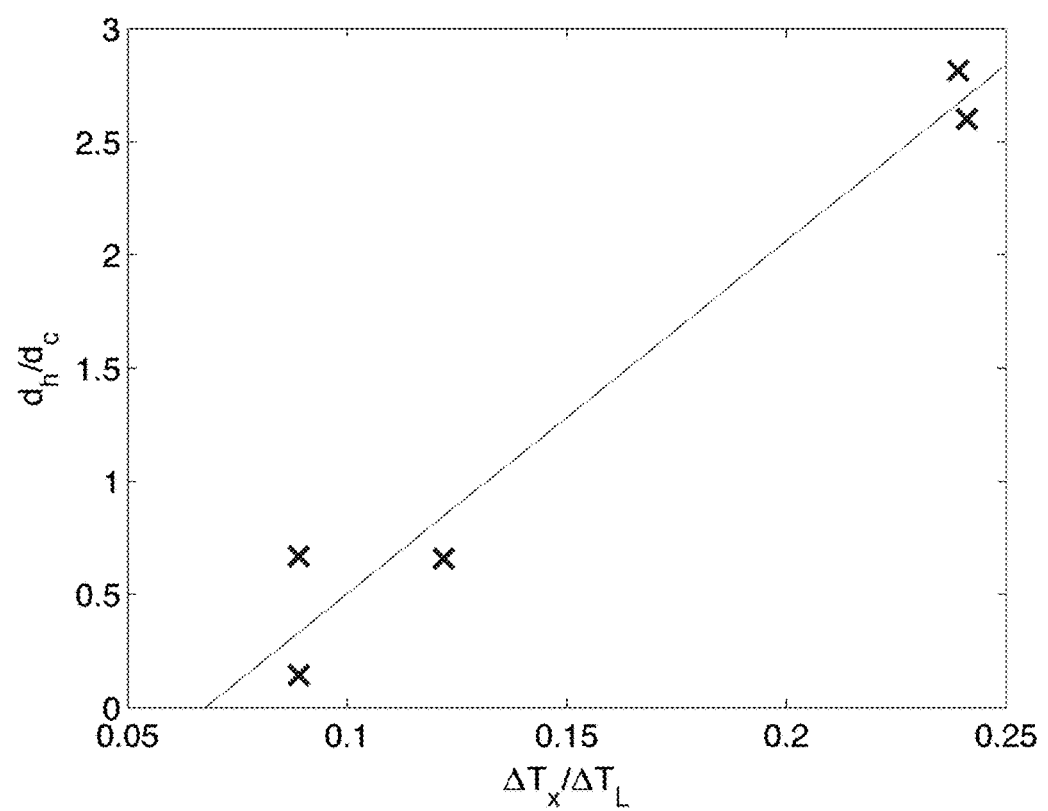
FIG. 11 provides a correlation between $\Delta T_x/\Delta T_L$ and $d^*/d_c$.

Zr-based and Cu-based Metallic Glasses: The TTT-diagrams on heating a Zr-based and a Cu-based a metallic glass having compositions $Zr_{41.2}Ti_{13.8}Cu_{12.5}Ni_{10}Be_{22.5}$ and $Cu_{47}Ti_{33}Zr_{11}Ni_8Si_1$ are presented in FIG. 10. The experimental TTT data are fitted using power-law functions. Data for $T_g$ and $T_L$ for each alloy are presented in Table 1. The two metallic glass compositions have different stabilities against crystallization. Specifically, metallic glass $Zr_{41.2}Ti_{13.8}Cu_{12.5}Ni_{10}Be_{22.5}$ appears to be more stable against crystallization than $Cu_{47}Ti_{33}Zr_{11}Ni_8Si_1$, as the time to crystallize at any given temperature in the supercooled liquid region is longer by orders of magnitude. From FIG. 10, no temperature can be associated with the crystallization time of $t_h$=0.135 s in $Zr_{41.2}Ti_{13.8}Cu_{12.5}Ni_{10}Be_{22.5}$, as this metallic glass is so stable that any temperature in the supercooled liquid region (i.e. below its $T_l$) has an associated $t_h$ that is much greater than the critical $t_h$ of 0.135 s characterizing the process of depositing layers having thickness of 1 mm. On the other hand, the temperature associated with the crystallization time of $t_h$=0.135 s in $Cu_{47}Ti_{33}Zr_{11}Ni_8Si_1$ is only 803 K. This characteristic temperature represents the upper limit in the interface temperature $T_s$ for $Cu_{47}Ti_{33}Zr_{11}Ni_8Si_1$ in order to avoid crystallization during the layer deposition process. Because the two alloys have $T_g$ of about 650 K and $T_L$ of about 1100 K, and since $T_o$ is at 300 K, the enthalpy function of FIG. 3 is approximately valid, and thus the plot corresponding to the "Half Enthalpy" criterion of FIG. 5 can be used to determine the upper limit in $T_i$, associated with the upper limit in $T_s$ for each metallic glass. From FIG. 5, there is no upper bound in $T_i$ in $Zr_{41.2}Ti_{13.8}Cu_{12.5}Ni_{10}Be_{22.5}$, since there is no upper bound in $T_s$ in this alloy for the deposition process involving 1 mm thick layers. But for $Cu_{47}Ti_{33}Zr_{11}Ni_8Si_1$ having an upper limit in $T_s$ of 803 K, $T_i$ is 1165 K, which is exactly $T_L$ for this alloy. These results are summarized in Table 1. The implication of these results is that $Zr_{41.2}Ti_{13.8}Cu_{12.5}Ni_{10}Be_{22.5}$, being very stable against crystallization, has no upper bound in the added layer temperature $T_i$, thereby it can be expected to produce amorphous multilayers consisting of 1 mm thick layers independently of $T_i$. On the other hand, $Cu_{47}Ti_{33}Zr_{11}Ni_8Si_1$, being rather unstable against crystallization, may only produce amorphous multilayers consisting of 1 mm thick layers if $T_i$ is kept at its $T_L$ or below, which is rather limiting as below $T_L$ the liquid is already unstable against crystallization.

Au-based Metallic Glass: The TTT-diagram on heating an Au-based metallic glass having composition $Au_{49}Ag_{5.5}Pd_{23}Cu_{26.9}Si_{16.3}$ is presented in FIG. 8. Data for $T_g$ and $T_L$ is presented in Table 1. From FIG. 8, the temperature associated with the crystallization time of $t_h$=0.135 s is 577 K. This characteristic temperature represents the upper limit in the interface temperature $T_s$ in order to avoid crystallization during the layer deposition process. Since the alloy has $T_g$ of about 400 K and $T_L$ of about 650 K, and since $T_o$ is at 300 K, the enthalpy function of FIG. 4 is approximately valid, and thus the plot corresponding to the "Half Enthalpy" criterion of FIG. 6 can be used to determine the upper limit in $T_i$, associated with the upper limit in $T_s$. From FIG. 6, for an upper limit in $T_s$ of 577 K, $T_i$ is 882 K, which is considerably higher than $T_L$. These results are summarized in Table 1.

TABLE 1

Glass transition temperature, liquidus temperature, ratio of glass-transition to liquidus temperature, and upper limits in the interface and added layer temperatures for the layer deposition process of five example metallic glass alloys, where the base layer is held at room temperature and the thickness of all layers is 1 mm.

| Composition | $T_g$ [K] | $T_L$ [K] | $T_s$ [K] (upper limit) | $T_i$ [K] (upper limit) |
|---|---|---|---|---|
| $Ni_{68.17}Cr_{8.65}Nb_{2.98}P_{16.92}B_{3.28}$ | 676 | 1152 | 920 | 1486 |
| $Ni_{71.4}Cr_{5.52}Nb_{3.38}P_{16.67}B_{3.03}$ | 666 | 1139 | 753 | 1002 |
| $Zr_{41.2}Ti_{13.8}Cu_{12.5}Ni_{10}Be_{22.5}$ | 623 | 993 | >$T_L$ | >>$T_L$ |
| $Cu_{47}Ti_{33}Zr_{11}Ni_8Si_1$ | 683 | 1165 | 803 | 1165 |
| $Au_{49}Ag_{5.5}Pd_{2.3}Cu_{26.9}Si_{16.3}$ | 401 | 644 | 577 | 882 |

A high $T_i$ value generally indicates suitability of the metallic glass for processing amorphous multilayers by layer-by-layer deposition. That is, the higher the estimated T the more stable the metallic glass can be for layer-by-layer deposition. Therefore, in embodiments the estimated $T_i$, may be used as a measure of the suitability of the metallic glass for layer-by-layer deposition at a given thickness. In general, if the estimated $T_i$ is at least as high as the liquidus temperature $T_L$, the overall process becomes more manageable as the liquid may be held at $T_i$ in some reservoir prior to deposition for extended periods without crystallizing. However, if the estimated $T_i$ is below the liquidus temperature $T_L$, the overall process becomes somewhat more complicated as the liquid is already unstable against crystallization. In accordance with embodiments, solutions may be devised for cases where $T_i < T_L$, where the liquid is held in a reservoir at a temperature above $T_L$ and is actively cooled to $T_i$ prior to being deposited. Nevertheless, metallic glasses having an estimated $T_i$ for additive manufacturing at a specific thickness that is at least as high as the liquidus temperature $T_L$, the metallic glass may be considered suitable for such process.

In other embodiments, it is possible to carry out the inverse analysis, where the maximum layer thickness $d_h$ for which $T_i$ is equal to or greater than $T_L$ is estimated for a given alloy. The thickness $d_h$ is assumed to be the maximum base layer thickness for a given alloy where the multilayer processing by layer-by-layer deposition process is performed with the melt in the equilibrium liquid state (i.e. at or above $T_L$). In such embodiments, $T_s/T_L$ associated with $T_i/T_L$=1 can be determined from the "Half Enthalpy" criterion as in the plots of FIGS. 5 and 6. The time for each alloy to crystallize at the estimated $T_s$, $t_h(T_s)$, may then be obtained from the TTT diagrams (FIGs. and 8-10), and the maximum layer thickness $d_h$ may finally be estimated in accordance with embodiments.

Ni-based Metallic Glasses: Because the two Ni-based metallic glass alloys have $T_g$ of about 650 K and $T_L$ of about 1100 K, and since $T_o$ is at 300 K, the enthalpy function of FIG. 2 is approximately valid, and the plot corresponding to the "Half Enthalpy" criterion of FIG. 5 can be used to determine $T_s/T_L$ associated with $T_i/T_L$=1 for each metallic glass. From FIG. 5, $T_s/T_L$=0.689, which corresponds to $T_s$ of 794 K and 785 K for $Ni_{68.17}Cr_{8.65}Nb_{2.98}P_{16.92}B_{3.28}$ and $Ni_{71.4}Cr_{5.52}Nb_{3.38}P_{16.67}B_{3.03}$ respectively. From the TTT diagrams in FIG. 9 it is possible, in accordance with embodiments, to obtain the value $t_h(T_s)$ for $Ni_{68.17}Cr_{8.65}Nb_{2.98}P_{16.92}B_{3.28}$ and $Ni_{71.4}Cr_{5.52}Nb_{3.38}P_{16.67}B_{3.03}$ to be 0.74 s and 0.082 s respectively. Using Eq. (11), the maximum thickness $d_h$ can be respectively estimated to be 2.3 mm and 0.78 mm. The maximum thickness $d_h$ is about three times larger for the more stable $Ni_{68.17}Cr_{8.65}Nb_{2.98}P_{16.92}B_{3.28}$ compared to $Ni_{71.4}Cr_{5.52}Nb_{3.38}P_{16.67}B_{3.03}$. These results suggest that $Ni_{68.17}Cr_{8.65}Nb_{2.98}P_{16.92}B_{3.28}$ may be used in multilayer processing by layer-by-layer deposition using thicknesses up to 2.3 mm while the added layer temperature $T_i$ is at or above $T_L$. On the other hand, $Ni_{71.4}Cr_{5.52}Nb_{3.38}P_{16.67}B_{3.03}$ may be used in multilayer processing by layer-by-layer deposition using thicknesses up to only 0.78 mm while the added layer temperature $T_i$ is at or above $T_L$. Therefore $Ni_{68.17}Cr_{8.65}Nb_{2.98}P_{16.92}B_{3.28}$ is more suitable for multilayer processing by layer-by-layer deposition than $Ni_{71.4}Cr_{5.52}Nb_{3.38}P_{16.67}B_{3.03}$.

Zr-based and Cu-based Metallic Glasses: Because the Zr-based and the Cu-based metallic glass alloys have $T_g$ of about 650 K, and $T_L$ of about 1100 K and since $T_o$ is at 300 K, the enthalpy function of FIG. 3 is approximately valid, and the plot corresponding to the "Half Enthalpy" criterion of FIG. 5 can be used to determine $T_s/T_L$ associated with $T_i/T_L=1$ for each metallic glass. From FIG. 5, $T_s/T_L=0.689$, which corresponds to $T_s$ of 684 K and 803 K for $Zr_{41.2}Ti_{13.8}Cu_{12.5}Ni_{10}Be_{22.5}$ and $Cu_{47}Ti_{33}Zr_{11}Ni_8Si_1$, respectively. From the TTT diagrams in FIG. 10 one may therefore obtain the value $t_h(T_s)$ for $Zr_{41.2}Ti_{13.8}Cu_{12.5}Ni_{10}Be_{22.5}$ and $Cu_{47}Ti_{33}Zr_{11}Ni_8Si_1$ to be 360 s and 0.135 s respectively. Using Eq. (11), the maximum thickness $d_h$ can be respectively estimated to be 52 mm and 1 mm. The maximum thickness $d_h$ is about fifty times larger for the more stable $Zr_{41.2}Ti_{13.8}Cu_{12.5}Ni_{10}Be_{22.5}$ compared to $Cu_{47}Ti_{33}Zr_{11}Ni_8Si_1$. This suggests that $Zr_{41.2}Ti_{13.8}Cu_{12.5}Ni_{10}Be_{22.5}$ can be used in multilayer processing by layer-by-layer deposition using thicknesses up to 52 mm while the added layer temperature $T_i$ is at or above $T_L$. On the other hand, $Cu_{47}Ti_{33}Zr_{11}Ni_8Si_1$ can be used in multilayer processing by layer-by-layer deposition using thicknesses up to only 1 mm while the added layer temperature $T_i$ is at or above $T_L$. Therefore $Zr_{41.2}Ti_{13.8}Cu_{12.5}Ni_{10}Be_{22.5}$ is far more suitable for multilayer processing by layer-by-layer deposition than $Cu_{47}Ti_{33}Zr_{11}Ni_8Si_1$.

Au-based Metallic Glass: Because the Au-based metallic glass alloy $Au_{49}Ag_{5.5}Pd_{2.3}Cu_{26.9}Si_{16.3}$ has $T_g$ of about 400 K and $T_L$ of about 650 K and since $T_o$ is at 300 K, the enthalpy function of FIG. 4 is approximately valid, and the plot corresponding to the "Half Enthalpy" criterion of FIG. 6 can be used to determine $T_s/T_L$ associated with $T_i/T_L=1$ for each metallic glass. From FIG. 6, $T_s/T_L=0.74$, which corresponds to $T_s$ of 477 K. From the TTT diagram of FIG. 8 one may therefore obtain $t_h(T_s)$ to be 7.0 s. Using Eq. (11), the maximum thickness $d_h$ can be estimated to be 7.2 mm. This suggests that $Au_{49}Ag_{5.5}Pd_{2.3}Cu_{26.9}Si_{16.3}$ can be used in multilayer processing by layer-by-layer deposition using thicknesses up to 6.4 mm while the added layer temperature $T_i$ is at or above $T_L$.

TABLE 2

Interface temperature, crystallization time, and maximum layer thickness for five example metallic glass alloys associated with the condition of the added layer temperature being equal to the liquidus temperature.

| Composition | $T_s$ [K] | $t_h(T_s)$ [s] | $d_h$ [mm] |
|---|---|---|---|
| $Ni_{68.17}Cr_{8.65}Nb_{2.98}P_{16.92}B_{3.28}$ | 794 | 0.74 | 2.3 |
| $Ni_{71.4}Cr_{5.52}Nb_{3.38}P_{16.67}B_{3.03}$ | 785 | 0.082 | 0.78 |
| $Zr_{41.2}Ti_{13.8}Cu_{12.5}Ni_{10}Be_{22.5}$ | 684 | 360 | 52 |

TABLE 2-continued

Interface temperature, crystallization time, and maximum layer thickness for five example metallic glass alloys associated with the condition of the added layer temperature being equal to the liquidus temperature.

| Composition | $T_s$ [K] | $t_h(T_s)$ [s] | $d_h$ [mm] |
|---|---|---|---|
| $Cu_{47}Ti_{33}Zr_{11}Ni_8Si_1$ | 803 | 0.135 | 1.0 |
| $Au_{49}Ag_{5.5}Pd_{2.3}Cu_{26.9}Si_{16.3}$ | 477 | 7.0 | 7.2 |

Figure 9:
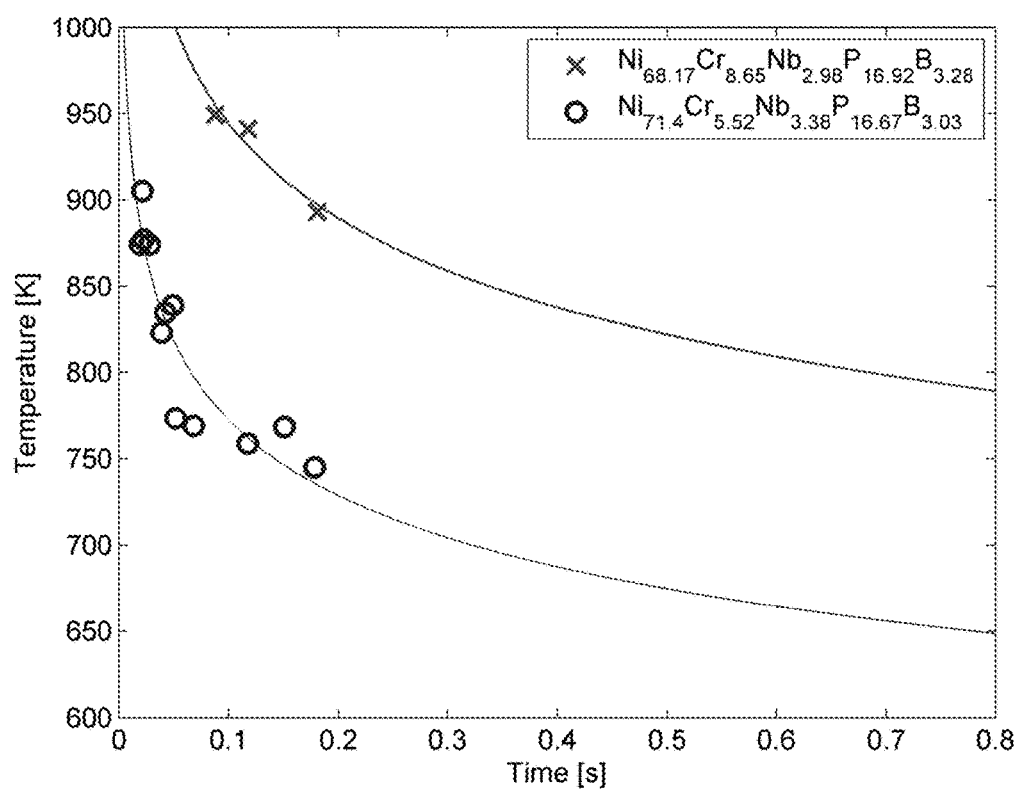
FIG. 9 provides TTT diagrams associated with heating from the glass state for $Ni_{68.17}Cr_{8.65}Nb_{2.98}P_{16.92}B_{3.28}$ and $Ni_{71.4}Cr_{5.52}Nb_{3.38}P_{16.67}B_{3.03}$ metallic glass forming alloys.

The variation in the maximum added layer thickness to avoid crystallization in the added layer, $d_h$, between the alloys is related to the differences in the TTT-diagrams upon heating (FIGS. 8-10) among the alloys. These differences do not necessarily correlate with the maximum added layer thickness to avoid crystallization in the added layer, $d_c$, between the alloys, which is related to the TTT-diagrams upon cooling (FIG. 7). For example, alloys $Ni_{68.17}Cr_{8.65}Nb_{2.98}P_{16.92}B_{3.28}$ and $Ni_{71.4}Cr_{5.52}Nb_{3.38}P_{16.67}B_{3.03}$ are both Ni-based bulk glass forming alloys of similar composition. Specifically, $Ni_{68.17}Cr_{8.65}Nb_{2.98}P_{16.92}B_{3.28}$ has a $d_h$ of 2.3 mm while $Ni_{71.4}Cr_{5.52}Nb_{3.38}P_{16.67}B_{3.03}$ has a $d_h$ of just 0.78 mm, and hence $Ni_{68.17}Cr_{8.65}Nb_{2.98}P_{16.92}B_{3.28}$ is considered more suitable for layer-by-layer deposition than $Ni_{71.4}Cr_{5.52}Nb_{3.38}P_{16.67}B_{3.03}$ The TTT-diagram upon cooling has not been investigated for these alloys, but their critical casting thickness is known. The critical casting thickness for $Ni_{71.4}Cr_{5.52}Nb_{3.38}P_{16.67}B_{3.03}$ is 11 mm while that of $Ni_{68.17}Cr_{8.65}Nb_{2.98}P_{16.92}B_{3.28}$ is 7 mm. Therefore, $d_c$ for $Ni_{71.4}Cr_{5.52}Nb_{3.38}P_{16.67}B_{3.03}$ can be assumed to be 5-6 mm, while that for $Ni_{68.17}Cr_{8.65}Nb_{2.98}P_{16.92}B_{3.28}$ 3-4 mm. Both alloys though have a $d_h$ that is smaller than their $d_c$. Also, $Ni_{71.4}Cr_{5.52}Nb_{3.38}P_{16.67}B_{3.03}$ has a larger $d_c$ but a smaller $d_h$ as compared to $Ni_{68.17}Cr_{8.65}Nb_{2.98}P_{16.92}B_{3.28}$. The higher $d_c$ for $Ni_{71.4}Cr_{5.52}Nb_{3.38}P_{16.67}B_{3.03}$ is a consequence of longer crystallization "nose" time $t_c$, in the TTT-diagram associated with cooling of the liquid as compared to $Ni_{68.17}Cr_{8.65}Nb_{2.98}P_{16.92}B_{3.28}$. However, as seen in FIG. 9, the TTT-diagram on heating from the low temperature glass phase reveals larger crystallization times $t_h$ for $Ni_{68.17}Cr_{8.65}Nb_{2.98}P_{16.92}B_{3.28}$ as compared to $Ni_{71.4}Cr_{5.52}Nb_{3.38}P_{16.67}B_{3.03}$, resulting in a higher $d_h$ for $Ni_{68.17}Cr_{8.65}Nb_{2.98}P_{16.92}B_{3.28}$. Since $T_s$ for the two Ni-based alloys is relatively high in the undercooled liquid region (i.e. closer to $T_L$ than to $T_g$), the limiting criterion is that of Eq. (11), i.e. the layer thickness can be limited to $d_h$.

On the other hand, $Zr_{41.2}Ti_{13.8}Cu_{12.5}Ni_{10}Be_{22.5}$ is known to have a $t_{cn}$ of ~70 s (Y. J. Kim, R. Busch, W. L. Johnson, A. J. Rulison, and W. K. Rhim, "Experimental determination of the time-temperature-transformation diagram of the undercooled liquid $Zr_{41.2}Ti_{13.8}Cu_{12.5}Ni_{10}Be_{22.5}$ alloy using containerless electrostatic levitation processing", *Appl. Phys. Lett.*, 68, 1057-1059 (1996)), and $Au_{49}Ag_{5.5}Pd_{2.3}Cu_{26.9}Si_{16.3}$ has a t of ~0.23 s (FIG. 7). Using Eq. (7) with $T_L=993$ K and $T_s=684$ K for $Zr_{41.2}Ti_{13.8}Cu_{12.5}Ni_{10}Be_{22.5}$ and $T_L=644$ K and $T_s=477$ K for $Zr_{41.2}Ti_{13.8}Cu_{12.5}Ni_{10}Be_{22.5}$ $Au_{49}Ag_{5.5}Pd_{2.3}Cu_{26.9}Si_{16.3}$ (Tables 1 and 2), one can therefore estimate $d_c=28$ mm for $Zr_{41.2}Ti_{13.8}Cu_{12.5}Ni_{10}Be_{22.5}$ and $d_c=1.5$ mm for $Au_{49}Ag_{5.5}Pd_{2.3}Cu_{26.9}Si_{16.3}$. But the estimated $d_h$ for both alloys is greater than their respective $l_c$, with $d_h=52$ mm for $Zr_{41.2}Ti_{13.8}Cu_{12.5}Ni_{10}Be_{22.5}$ and $d_h=7.2$ mm for $Au_{49}Ag_{5.5}Pd_{2.3}Cu_{26.9}Si_{16.3}$. This is because $T_s$ for $Zr_{41.2}Ti_{13.8}Cu_{12.5}Ni_{10}Be_{22.5}$ and $Au_{49}Ag_{5.5}Pd_{2.3}Cu_{26.9}Si_{16.3}$ is relatively high in the undercooled liquid region (i.e. closer to $T_g$ than to $T_L$), and as such, the limiting criterion is that of Eq. (7), i.e. the layer thickness can be limited to $d_c$.

Lastly, the critical casting thickness of $Cu_{47}Ti_{33}Zr_{11}Ni_8Si_{1.5}$ is known to be ~3-4 mm, which suggests a $d_c$ of 1-2 mm. The estimated $d_h$ is 1 mm (Table 2), i.e. of the same order as $d_c$. The reason $d_c$ and $d_h$ are nearly equal for $Cu_{47}Ti_{33}Zr_{11}Ni_8Si_{1.5}$ is because $T_s$ for this alloy is near the middle of the undercooled liquid region (i.e. not closer to either $T_g$ or $T_L$).

Since the metallic glass dimension of every metallic glass forming alloy is inherently limited by the critical casting thickness $d_c$, metallic glasses with $d_h > d_c$ may be more suitable for layer-by-layer deposition compared to those with $d_h < d_c$, as their layer thickness is not limited by the critical casting thickness.

In embodiments, the estimated $d_h$ for a given a metallic glass alloy may be correlated to the parameter $\Delta T_x$, defined as the difference between the crystallization temperature $T_x$ measured at constant heating rate of 20 K/min and $T_g$, i.e. $\Delta T_x = T_x T_g$. The $\Delta T$ values for the example alloys are presented in Table 3. As seen in Table 3, $\Delta T$ correlates well with $d_h$, and adequately predicts the suitability of a metallic glass alloy for multilayer processing by layer-by-layer deposition. Specifically, alloys with $\Delta T_x$ greater than 50 K are those that have been determined to be generally stable against crystallization for multilayer processing by layer-by-layer deposition, while alloys with $\Delta T_x$ less than 50 K are those determined not to be quite as stable. Therefore, in some embodiments of the disclosure, metallic glasses that demonstrate $\Delta T_x$ of at least 50 K are considered suitable for multilayer processing by layer-by-layer deposition. In other embodiments of the disclosure, metallic glasses that demonstrate $\Delta T_x$ of at least 60 K are considered suitable for multilayer processing by layer-by-layer deposition. In yet other embodiments of the disclosure, metallic glasses that demonstrate $\Delta T_x$ of at least 70 K are considered suitable for multilayer processing by layer-by-layer deposition.

Embodiments of the correlation function given by Eq. (12) may provide an approximate estimate of $d_h$ provided that $d_c$, $\Delta T_x$ and $\Delta T_L$ are known for a given metallic glass forming alloy, as $d_h = d_c(15.59\Delta T_x/\Delta T_L - 1.056)$. According to Eq. (12), $d_h/d_c > 1$ when $\Delta T_x/\Delta T_L > 0.132$. Therefore, in embodiments using alloys with $\Delta T_x/\Delta T_L$ greater than about 0.1 may be considered generally stable against crystallization for multilayer processing by layer-by-layer deposition, while alloys with $\Delta T_x/\Delta T_L$ less than about 0.1 may be considered not quite as stable. Therefore, in some embodiments of the disclosure, metallic glasses that demonstrate $\Delta T_x/\Delta T_L$ of at least 0.1 are considered suitable for multilayer processing by layer-by-layer deposition. In other embodiments of the disclosure, metallic glasses that demonstrate $\Delta T_x/\Delta T_L$ of at least 0.132 are considered suitable for multilayer processing by layer-by-layer deposition. In other embodiments of the disclosure, metallic glasses that demonstrate $\Delta T_x/\Delta T_L$ of at least 0.15 are considered suitable for multilayer processing by layer-by-layer deposition. In yet other embodiments of the disclosure, metallic glasses that demonstrate $\Delta T_x/\Delta T_L$ of at least 0.2 are considered suitable for multilayer processing by layer-by-layer deposition.

Example Layer Deposition Methods: The disclosure is generally directed to methods of forming a metallic glass multilayer by depositing a layer of metallic glass-forming liquid over a layer of metallic glass. In certain embodiments, the disclosure is directed to any methods capable of depositing a metallic glass-forming liquid over a layer of metallic glass.

In one embodiment, the layer deposition method is melt spinning (see, for example, R. Pond and R. Maddin, Transactions of the Metallurgical Society of AIME, Volume: 245, Issue: 11, Page: 2475, 1976, the reference of which is incorporated herein in its entirety), in which a base metallic glass layer may be formed by injecting a continuous melt stream on a thermally conducting wheel rotating at high speed. Subsequently, an added layer may be deposited by injecting a continuous melt stream at temperature $T_i$ on a

TABLE 3

$\Delta T_x$, $\Delta T_L$, $d_h$ and $d_c$ data for five example metallic glass alloys associated with the condition of the added layer temperature being equal to the liquidus temperature.

| Composition | $\Delta T_x$ [K] | $\Delta T_L$ [K] | $\Delta T_x/\Delta T_L$ | $d_h$ [mm] | $d_c$ [mm] | $d_h/d_c$ |
|---|---|---|---|---|---|---|
| $Ni_{68.17}Cr_{8.65}Nb_{2.98}P_{16.42}B_{3.28}$ | 58 | 476 | 0.122 | 2.3 | 3.5 | 0.657 |
| $Ni_{71.4}Cr_{5.52}Nb_{3.38}P_{16.67}B_{3.03}$ | 42 | 473 | 0.089 | 0.78 | 5.5 | 0.142 |
| $Zr_{41.2}Ti_{13.8}Cu_{12.5}Ni_{10}Be_{22.5}$ | 89 | 370 | 0.241 | 52 | 20 | 2.600 |
| $Cu_{47}Ti_{33}Zr_{11}Ni_8Si_1$ | 43 | 482 | 0.089 | 1.0 | 1.5 | 0.667 |
| $Au_{49}Ag_{5.5}Pd_{2.3}Cu_{26.9}Si_{16.3}$ | 58 | 243 | 0.239 | 7.2 | 2.5 | 2.813 |

In other embodiments correlating $d_h/d_c$ and quantifying the suitability of a metallic glass alloy for multilayer processing by layer-by-layer deposition may be accomplished through the ratio $\Delta T_x/\Delta T_L$, where $\Delta T_L$ is defined as the difference between $T_L$ and $T_g$ and is a measure of the undercooled liquid region. The parameter $\Delta T_x/\Delta T_L$ quantifies the stability of the metallic glass against crystallization, i.e. $\Delta T_x = T_x T_{-g}$, in relation to its undercooled liquid region, i.e. $\Delta T_L = T_L - T_g$. As seen in Table 3 and FIG. 10, $\Delta T_x/\Delta T_L$ correlates with $d_h/d_c$, and adequately predicts the suitability of a metallic glass alloy for multilayer processing by layer-by-layer deposition. Accordingly, in some embodiments, the correlation approximately follows the following linear relation:

$$d_h/d_c = 15.59\Delta T_x/\Delta T_L - 1.056 \qquad (12)$$

rotating roll or mandrel of the base metallic glass layer at temperature $T_o$ to form a metallic glass multilayer.

In another embodiment, the layer deposition method is planar flow casting (as described, for example, in U.S. Pat. No. 4,290,476, the reference of which is incorporated herein in its entirety), in which a base metallic glass layer may be formed by injecting a continuous melt stream on a thermally conducting movable chill surface. Subsequently, an added layer may be deposited by injecting a continuous melt stream at temperature $T_i$ on a movable base metallic glass layer at temperature $T_o$ to form a metallic glass multilayer.

In yet another embodiment, the layer deposition method is by a spray deposition method (as described, for example, in United States Patent Applications No 20130306198 and 20140202595, the references of which are incorporated herein in their entirety), in which a base metallic glass layer may be formed by injecting a stream of discontinuous droplets on a moving substrate. Subsequently, an added layer may be deposited by injecting a stream of discontinuous droplets at temperature $T_i$ on a movable base metallic glass layer at temperature $T_o$ to form a metallic glass multilayer.

In yet another embodiment, the disclosure is directed to the "shearless melt deposition" method, as disclosed in Provisional Patent Application No. 61/884,653, titled "Production of Metallic Glass Sheet by Melt Deposition," filed on Sep. 30, 2013, the reference of which is incorporated herein in its entirety. That method includes forming of a metallic glass layer by a melt deposition process, where a molten alloy is deposited inside a channel formed by two substrate plates, and shaped and quenched by conduction to the substrates in a manner that enables the melt to deposit and vitrify, i.e. to transform to the metallic glass phase, without undergoing substantial shear flow. The melt is held in a reservoir at a controlled temperature and is injected at a controlled deposition rate Q. In some embodiments, the temperature of the melt is more precisely controlled as the melt exits a nozzle. The two substrate plates include (1) a chill plate, which may be moving at a controlled speed V and (2) a guide plate, which may be attached to the nozzle, may be thermally insulated from the nozzle, may be at a temperature below $T_{cn}$, and may be stationary. Once a metallic glass base layer is formed, the chill plate may be transporting the base layer held at temperature $T_o$ while melt may be deposited over the metallic glass base layer at temperature $T_o$ to form a metallic glass multilayer. This embodiment is illustrated schematically in FIGS. 12 and 13.

Figure 12:
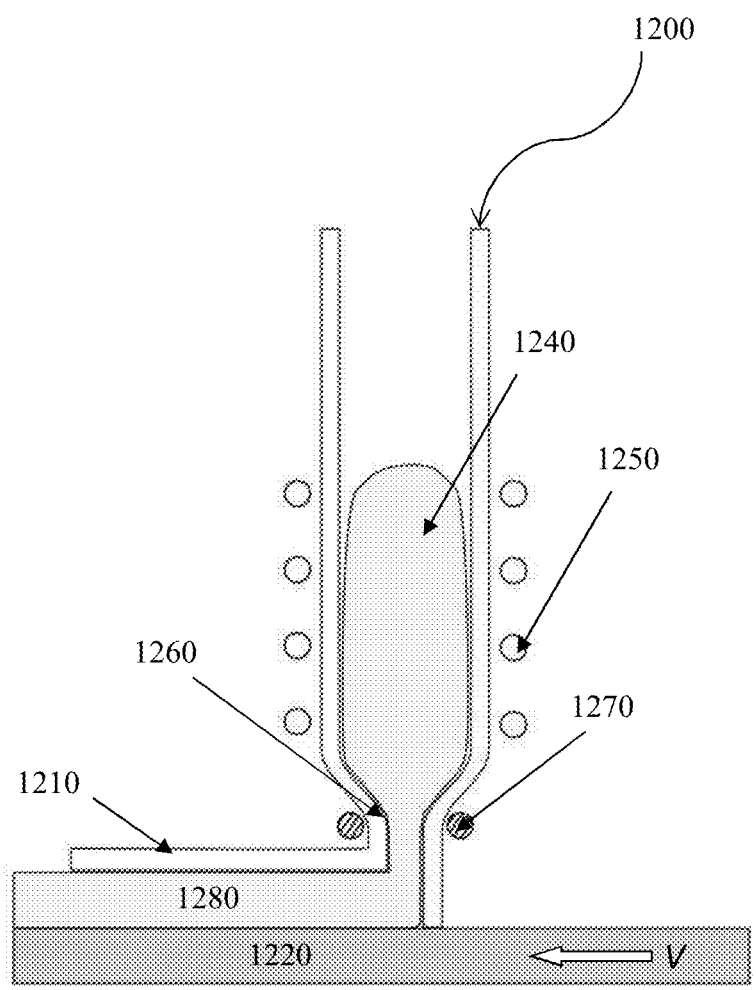
FIG. 12 provides a 2D schematic illustrating the implementation of the "shearless melt deposition" method for layer-by-layer deposition.
Figure 13:
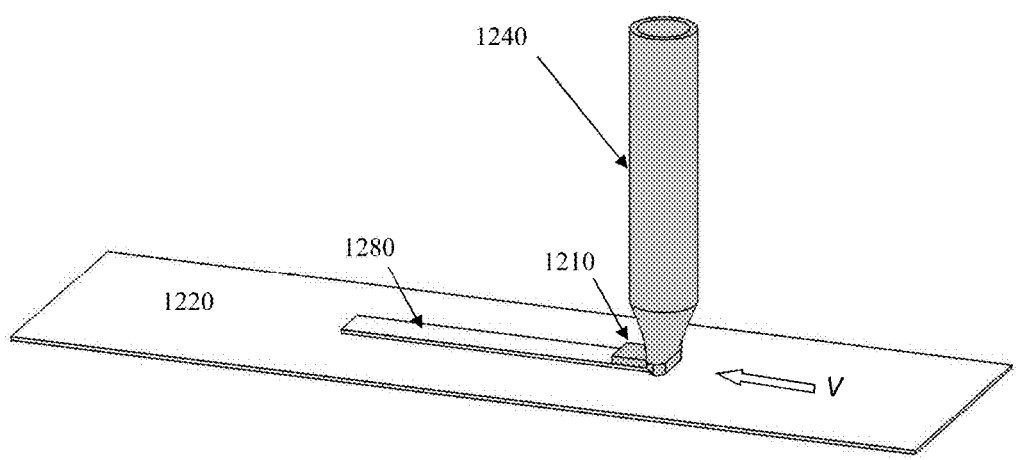
FIG. 13 provides a 3D schematic illustrating the implementation of the "shearless melt deposition" method for layer-by-layer deposition.

In some embodiments, as shown schematically in FIG. 12, a metallic glass multilayer may be forming using an apparatus 1200. In such an apparatus, a flat guide substrate 1210 of width w can move over a base metallic glass layer 1220 on a stationary chill plate 1230 at velocity V. The guide substrate 12100 may be connected to a melt reservoir 1240 in which the molten alloy is contained with nozzle 12600 In many embodiments, the molten alloy is heated in the melt reservoir 1240 by a heating coil 1250, and the molten alloy temperature at the nozzle 1260 can be controlled by a nozzle heating coil 1270. The molten alloy may be extracted through the nozzle 1260 and deposited on base layer 1220.

Composite Multilayers

The disclosure in embodiments is directed to methods of forming metallic glass multilayer composites by layer-by-layer deposition of liquid layers of metallic glass-forming alloys, where each layer has a different metallic glass-forming alloy composition.

Having multilayers of different composition and/or thickness may be advantageous if one desires a composite multilayered metallic glass utilizing more two or more metallic glass compositions having different properties that can be utilized over different thicknesses. Specifically, a composite multilayer may offer a combination of properties that is not available in one of the component metallic glasses. One such combination of properties may be strength and toughness. It is generally known that strength and toughness in metallic glasses is usually mutually exclusive. For example, metallic glasses that exhibit a high to very high fracture toughness, $K_c$, generally exhibit a modest to low yield strength, $\sigma_y$, while metallic glasses that exhibit a high to very high yield strength generally exhibit a modest to low fracture toughness (see for example, M. D. Demetriou et al., Nature Materials, Vol. 10, pp. 123-128, 2011, the disclosure of which is incorporated herein by reference).

In some embodiments, the compressive yield strength can be used to represent the material yield strength, $\sigma_y$. The compressive yield strength is the stress at which the material yields plastically when loaded in compression. Specifically, the compressive yield strength is the measure of the material's ability to resist non-elastic yielding under compression.

In some embodiments, the notch toughness can be used to represent the material fracture toughness, $K_c$. Notch toughness is the measure of the material's ability to dissipate mechanical energy without propagation of a pre-existing crack. Specifically, notch toughness is a measure of the resistance to propagate a crack originating from a pre-existing notch. In the context of the disclosure, the "notch toughness" is defined as the stress intensity factor at crack initiation when measured on a 3 mm diameter rod containing a notch with length ranging from 1 to 2 mm and a notch root radius ranging from 0.1 to 0.15 mm.

In the context of the disclosure, the plastic zone radius $r_p$, defined as the length scale over which plastic deformation is accommodated in the absence of fracture, is a unique property for each metallic glass composition and is given by $r_p = K_c / \pi \sigma_y^2$.

In the context of the disclosure, tensile ductility is defined as the amount of plastic strain attained by the material following yielding under tensile loading.

In the context of the disclosure, certain criteria have been established by which a metallic glass multilayer composite that comprises at least two bonded metallic glass layers, where at least two layers comprise different metallic glass alloy compositions, may exhibit improved yield strength and fracture toughness over the constituent metallic glass compositions.

Specifically, the yield strength is a global property, and consequently the yield strength of the composite may approximately follow the "rules of mixtures" such that it may have a value that is near the volumetric average between the yield strengths of the constituent metallic glass compositions. In some embodiments, the yield strength of the composite may approximately lie between the upper and lower bound of the "rules of mixtures" as defined by the Voigt and Reuss models, respectively. In embodiments where the layers have equal thickness, the yield strength of the composite may have a value that is near the arithmetic average between the yield strengths of the constituent metallic glass compositions.

Fracture toughness on the other hand is a local property, and consequently the fracture toughness of the composite may be closer to the fracture toughness of one of the constituent metallic glass compositions rather than the average. The fracture toughness of metallic glasses is related to the total sliding distance in a shear band prior to crack opening (see for example, M. D. Demetriou et al., Nature Materials, Vol. 10, pp. 123-128, 2011, the disclosure of which is incorporated herein by reference). This limiting sliding distance can be related to plastic zone radius of the metallic glass, $r_p$. Shear bands initiated in the softer metallic glass layer (i.e. in the layer with the lowest shear modulus G) may be arrested by the stiffer metallic glass layer (i.e. by the layer with the highest shear modulus G) provided that they don't extend beyond the limiting sliding distance at which crack opening occurs. Therefore, if a significant shear modulus mismatch between the layers exists, and the layer thicknesses are confined within their respective plastic zone radii, the fracture toughness of the composite may be closer to the fracture toughness of the constituent metallic glass composition having the higher fracture toughness. Accordingly, in some embodiments, the fracture toughness of the composite may match or exceed the fracture toughness of the constituent metallic glass composition having the higher fracture toughness.

For a metallic glass, tensile ductility is also a local property like fracture toughness. This is because metallic glasses fail catastrophically almost immediately after yielding under tensile loading, because a propagating shear band under tension is unstable and evolves nearly spontaneously into a crack prior to networking with other shear bands, thus failing to produce any substantial global ductility. According to the mechanism introduced above, where shear bands initiated in the softer metallic glass layer (i.e. in the layer with the lowest shear modulus G) may be arrested by the stiffer metallic glass layer (i.e. by the layer with the highest shear modulus G) provided that they don't extend beyond the limiting sliding distance at which crack opening occurs, may enable the metallic glass multilayer composite to exhibit tensile ductility. Therefore, if a significant shear modulus mismatch between the layers exists, and the layer thicknesses are confined within their respective plastic zone radii, the tensile ductility of the composite may exceed those of the constituent metallic glass compositions.

Mechanistically, the concept of strengthening or toughening of composite materials has been widely utilized in composites with different morphologies that may include particles, fibers, or laminates (i.e. multilayers). However, for the same volume fraction of reinforcing phase, the laminate morphology has the maximum toughening efficiency, followed (in order of potency) by fiber and particulate morphologies. To design stronger and tougher composite materials, the material properties and microstructural components at multiple length scales can be controlled in order to promote toughening of the composite by optimizing the contributions from each layer phase without compromising the strength of the composite.

Lamellar (i.e. multilayered) composites are highly anisotropic materials such that the mechanical response, i.e., global strength and toughness, of the composite is dependent on the loading orientation. For example, the strength and toughness of a lamellar composite will differ whether the composite is loaded longitudinally or transversally to the layers. Assuming that the orientation of the crack-growth direction is perpendicular to the layers, lamellar metallic glass composites may derive most of their resistance to fracture during crack growth rather than during crack initiation. Extrinsic crack-tip shielding mechanisms, which may include crack bridging via the softer metallic glass layer (i.e. the layer with the lowest shear modulus G), may primarily act behind the crack tip and locally screen the crack from the applied (far-field) stress. Such extrinsic shielding mechanisms may generate a fracture toughness of the metallic glass multilayer composite that is higher than either of the fracture toughness values of the component metallic glasses while also retaining a strength near the volumetric average of the component metallic glass strengths. Such extrinsic shielding mechanisms may also generate a tensile ductility of the metallic glass multilayer composite that is higher than either of the tensile ductility values of the component metallic glasses while also retaining a strength near the volumetric average of the component metallic glass strengths.

Hence, the following criteria are established in accordance with the disclosure:

The relative difference between the shear moduli of the metallic glass alloy compositions is at least 2%.

The thickness of each layer does not exceed the plastic zone radius of the metallic glass alloy composition comprising the layer.

In the context of the disclosure, the relative difference between two values means the difference between two values divided by the larger of the two values.

In some embodiments, the yield strength of the metallic glass multilayer composite is measured on a multilayer that is loaded in a direction parallel to the layers. In some embodiments, the yield strength of the metallic glass multilayer composite is higher than the yield strength of the constituent metallic glass composition having the lowest yield strength. In one embodiment, the yield strength of the metallic glass multilayer composite is within 20% of the volumetric average between the yield strengths of the constituent metallic glass compositions. In another embodiment, the yield strength of the metallic glass multilayer composite is within 10% of the volumetric average between the yield strengths of the constituent metallic glass compositions. In yet another embodiment, the yield strength of the metallic glass multilayer composite is within 5% of the volumetric average between the yield strengths of the constituent metallic glass compositions.

In some embodiments, the fracture toughness of the metallic glass multilayer composite is measured on a multilayer that contains a notch and/or a pre-crack oriented normal to the layers. In some embodiments, the fracture toughness of the metallic glass multilayer composite is higher than the fracture toughness of the metallic glass composition having the lowest fracture toughness. In one embodiment, the fracture toughness of the metallic glass multilayer composite is higher than the arithmetic average of the fracture toughness values of the constituent metallic glass compositions. In another embodiment, the fracture toughness of the metallic glass multilayer composite is higher than the fracture toughness of the metallic glass composition having the highest fracture.

In some embodiments, the tensile ductility of the metallic glass multilayer composite is multilayer is measured on a multilayer that is loaded in a direction parallel to the layers. In some embodiments, the tensile ductility of the metallic glass multilayer composite is higher than the tensile ductility values of the constituent metallic glass compositions. In one embodiment, the tensile ductility of the metallic glass multilayer composite is at least 0.1%. In another embodiment, the tensile ductility of the metallic glass multilayer composite is at least 0.25%. In yet another embodiment, the tensile ductility of the metallic glass multilayer composite is at least 0.5%. In yet another embodiment, the tensile ductility of the metallic glass multilayer composite is at least 1%. In yet another embodiment, the tensile ductility of the metallic glass multilayer composite is at least 2%.

In some embodiments, the relative difference between the shear moduli of the metallic glass alloy compositions is at least 5%. In other embodiments, the relative difference between the shear moduli of the metallic glass alloy compositions is at least 10%. In other embodiments, the relative difference between the shear moduli of the metallic glass alloy compositions is at least 20%. In some embodiments, the difference between the shear moduli of the metallic glass alloy compositions is at least 1 GPa. In other embodiments, the difference between the shear moduli of the metallic glass alloy compositions is at least 2 GPa. In other embodiments, the difference between the shear moduli of the metallic glass alloy compositions is at least 5 GPa.

In some embodiments the layers have an equal thickness, wherein the thickness does not exceed the plastic zone radius of the metallic glass alloy composition having the smallest plastic zone radius.

The disclosure is also directed to methods of forming metallic glass multilayers composite by sequential layer-by-layer deposition. In the context of the disclosure, certain criteria have been established by which deposition of an added metallic glass layer over a base metallic glass layer of different alloy composition will promote wetting between the layers and avoid crystallization of either layer. These criteria are as follows:

The difference in the glass transition temperatures of the metallic glass compositions, $T_g$, is less than 50° C.

The difference in the liquidus temperatures of the metallic glass-forming alloy compositions, $T_L$, are less than 150° C.

Meeting these criteria enables the use of methods to fabricate metallic glass multilayers according to methods disclosed in the disclosure by assuming an effective $T_g^*$ and $T_L^*$ that are averages between the compositions. Specifically, $T_g^*=0.5(T_{g1}+T_{g2})$ and $T_L^*=0.5(T_{L1}+T_{L2})$, where $T_{g1}$ and $T_{g2}$ are the glass transition temperatures of the two metallic glass alloy compositions, and $T_{L1}$ and $T_{L2}$ are the liquidus temperatures of the two metallic glass forming alloy compositions. Hence, embodiments of methods in accordance with this disclosure for the formation of metallic glass multilayers may apply for the formation of metallic glass composite by substituting $T_g$ by $T_g^*$ and $T_L$ by $T_L^*$.

In the context of this disclosure, "different compositions" means that compositions vary by at least 1 percent in the atomic concentration of at least one element. In other embodiments, "different compositions" means that compositions vary by at least 2 percent in the atomic concentration of at least one element. In yet other embodiments, "different compositions" means that compositions vary by at least 5 percent in the atomic concentration of at least one element.

In some embodiments, the difference in the glass transition temperatures of the metallic glass compositions, $T_g$, is less than 30° C. In other embodiments, the difference in the glass transition temperatures of the metallic glass compositions, $T_g$, is less than 20° C. In yet other embodiments, the difference in the glass transition temperatures of the metallic glass compositions, $T_g$, is less than 10° C.

In some embodiments, the difference in the liquidus temperatures of the metallic glass-forming alloy compositions, $T_L$, is less than 80° C. In some embodiments, the difference in the liquidus temperatures of the metallic glass-forming alloy compositions, $T_L$, is less than 80° C. In other embodiments, the difference in the liquidus temperatures of the metallic glass-forming alloy compositions, $T_L$, is less than 60° C. In yet other embodiments, the difference in the liquidus temperatures of the metallic glass-forming alloy compositions, $T_L$, is less than 40° C.

In other embodiments, a criterion about the crystallization temperatures, $T_x$, similar to the criterion about the glass transition temperatures, $T_g$, may be met. Specifically, the difference in the crystallization temperatures of the metallic glass compositions, $T_x$, is less than 50° C. Meeting this criterion will enable the use of methods to fabricate metallic glass multilayers according to embodiments of the disclosure by assuming an effective $T_x^*$ that is an average between the compositions. Specifically, $T_x^*=0.5(T_{x1}+T_{x2})$, where $T_{x1}$ and $T_{x2}$ are the crystallization temperatures of the two metallic glass compositions. Hence, embodiments disclosed above for the formation of metallic glass multilayers may apply for the formation of composite metallic glass by substituting $T_x$ by $T_x^*$.

In some embodiments, the difference in the crystallization temperatures of the metallic glass compositions, $T_x$, is less than 30° C. In other embodiments, the difference in the crystallization temperatures of the metallic glass compositions, $T_x$, is less than 20° C. In yet other embodiments, the difference in the crystallization temperatures of the metallic glass compositions, $T_x$, is less than 10° C.

Example Alloy Pairs for Multilayer Composites

Several example alloy pairs are presented that satisfy the criteria introduced above for the formation of a multilayer composite.

EXAMPLE 1

$Ni_{68.17}Cr_{8.65}Nb_{2.98}P_{16.42}B_{3.28}Si_{0.5}$ and $Zr_{52.5}Ti_5Cu_{17.9}Ni_{14.6}Al_{10}$ Table 4 lists the shear modulus G, compressive yield strength $\sigma_y$, notch toughness $K_c$, plastic zone radius $r_p$, glass-transition temperature $T_g$, crystallization temperature $T_x$, and liquidus temperature $T_L$ for exemplary alloy pair $Ni_{68.17}Cr_{8.65}Nb_{2.98}P_{16.42}B_{3.28}Si_{0.5}$ and $Zr_{52.5}Ti_5Cu_{17.9}Ni_{14.6}Al_1$. The difference between the shear moduli of the metallic glass alloy compositions is about 8 GPa, while the relative difference is about 16%. The difference in the glass transition temperatures of the metallic glass compositions is 2° C., and $T_g^*$ is 399° C. The difference in the crystallization temperatures of the metallic glass compositions is 13° C., and $T_x^*$ is 468.5° C. The difference in the liquidus temperatures of the metallic glass-forming alloy compositions is 14° C., and $T_L^*$ is 877° C. In embodiments of composite metallic glass multilayers according to the disclosure, the layer thickness of $Ni_{68.17}Cr_{8.65}Nb_{2.98}P_{16.42}B_{3.28}Si_{0.5}$ should not exceed 0.3 mm, while the layer thickness of $Zr_{52.5}Ti_5Cu_{17.9}Ni_{14.6}Al_{10}$ should not exceed 1 mm. In embodiments of metallic glass multilayer composites having layers with equal thickness according to the disclosure, the layer thickness should not exceed 0.3 mm.

TABLE 4

Shear modulus G, compressive yield strength $\sigma_y$, notch toughness $K_c$, plastic zone radius $r_p$, glass-transition temperature $T_g$, crystallization temperature $T_x$, and liquidus temperature $T_L$ for example alloy pair $Ni_{68.17}Cr_{8.65}Nb_{2.98}P_{16.42}B_{3.28}Si_{0.5}$ and $Zr_{52.5}Ti_5Cu_{17.9}Ni_{14.6}Al_{10}$

| Composition | G (GPa) | $\sigma_y$ (MPa) | $K_c$ (MPa m$^{1/2}$) | $r_p$ (mm) | $T_g$ (° C.) | $T_x$ (° C.) | $T_L$ (° C.) |
|---|---|---|---|---|---|---|---|
| $Ni_{68.17}Cr_{8.65}Nb_{2.98}P_{16.42}B_{3.28}Si_{0.5}$ | 50.0 | 2418 | 77 | 0.3 | 400 | 462 | 884 |
| $Zr_{52.5}Ti_5Cu_{17.9}Ni_{14.6}Al_{10}$ | 31.8 | 1700 | 95 | 1.0 | 398 | 455 | 870 |

EXAMPLE 2

$Ni_{71.4}Cr_{5.52}Nb_{3.38}P_{16.67}B_{3.03}$ and
$Fe_{67}Mo_6Ni_{3.5}Cr_{3.5}P_{12}C_{5.5}B_{2.5}$ Table 5 lists the shear modulus G, compressive yield strength $\sigma_y$, notch toughness $K_c$, plastic zone radius $r_p$, glass-transition temperature $T_g$, crystallization temperature $T_x$, and liquidus temperature $T_L$ for exemplary alloy pair $Ni_{71.4}Cr_{5.52}Nb_{3.38}P_{16.67}B_{3.03}$ and $Fe_{67}Mo_6Ni_{3.5}Cr_{3.5}P_{12}C_{5.5}B_{2.5}$. The difference between the shear moduli of the metallic glass alloy compositions is 9.5 GPa, while the relative difference is about 16%. The difference in the glass transition temperatures of the metallic glass compositions is 49° C., and $T_g^*$ is 417.5° C. The difference in the crystallization temperatures of the metallic glass compositions is 44° C., and $T_x$, is 457° C. The difference in the liquidus temperatures of the metallic glass-forming alloy compositions is 138° C., and $T_L^*$ is 959° C. In embodiments of metallic glass multilayer composites according to the disclosure, the layer thickness of $Ni_{71.4}Cr_{5.52}Nb_{3.38}P_{16.67}B_{3.03}$ should not exceed 0.5 mm, while the layer thickness of $Fe_{67}Mo_6Ni_{3.5}Cr_{3.5}P_{12}C_{5.5}B_{2.5}$ should not exceed 0.07 mm. In embodiments of metallic glass multilayer composites having layers with equal thickness according to the disclosure, the layer thickness should not exceed 0.07 mm.

TABLE 5

Shear modulus G, compressive yield strength $\sigma_y$, notch toughness $K_c$, plastic zone radius $r_p$, glass-transition temperature $T_g$, crystallization temperature $T_x$, and liquidus temperature $T_L$ for example alloy pair $Ni_{71.4}Cr_{5.52}Nb_{3.38}P_{16.67}B_{3.03}$ and $Fe_{67}Mo_6Ni_{3.5}Cr_{3.5}P_{12}C_{5.5}B_{2.5}$

| Composition | G (GPa) | $\sigma_y$ (MPa) | $K_c$ (MPa m$^{1/2}$) | $r_p$ (mm) | $T_g$ (° C.) | $T_x$ (° C.) | $T_L$ (° C.) |
|---|---|---|---|---|---|---|---|
| $Ni_{71.4}Cr_{5.52}Nb_{3.38}P_{16.67}B_{3.03}$ | 48.9 | 2375 | 94 | 0.5 | 393 | 435 | 890 |
| $Fe_{67}Mo_6Ni_{3.5}Cr_{3.5}P_{12}C_{5.5}B_{2.5}$ | 59.4 | 3145 | 48 | 0.07 | 442 | 479 | 1028 |

EXAMPLE 3

$Ni_{71.4}Cr_{5.52}Nb_{3.38}P_{16.67}B_{3.03}$ and
$Ni_{67.5}Cr_{10}Nb_3P_{16.5}B_3$ Table 6 lists the shear modulus G, compressive yield strength $\square_y$, notch toughness $K_c$, plastic zone radius $r_p$, glass-transition temperature $T_g$, crystallization temperature $T_x$, and liquidus temperature $T_L$ for exemplary alloy pair $Ni_{71.4}Cr_{5.52}Nb_{3.38}P_{16.67}B_{3.03}$ and $Ni_{67.5}Cr_{10}Nb_3P_{16.5}B_3$. The difference between the shear moduli of the metallic glass alloy compositions is 3.3 GPa, while the relative difference is about 6%. The difference in the glass transition temperatures of the metallic glass compositions is 2° C., and $T_g^*$ is 394° C. The difference in the crystallization temperatures of the metallic glass compositions is about 4° C., and $T_x$, is about 439° C. The difference in the liquidus temperatures of the metallic glass-forming alloy compositions is 17° C., and $T_L^*$ is 898.5° C. In embodiments of metallic glass multilayer composites according to the disclosure, the layer thickness of $Ni_{71.4}Cr_{5.52}Nb_{3.38}P_{16.67}B_{3.03}$ should not exceed 0.5 mm, while the layer thickness of $Ni_{67.5}Cr_{10}Nb_3P_{16.5}B_3$ should not exceed 0.08 mm. In embodiments of metallic glass multilayer composites having layers with equal thickness according to the disclosure, the layer thickness should not exceed 0.08 mm.

TABLE 6

Shear modulus G, compressive yield strength $\sigma_y$, notch toughness $K_c$, plastic zone radius $r_p$, glass-transition temperature $T_g$, crystallization temperature $T_x$, and liquidus temperature $T_L$ for example alloy pair $Ni_{71.4}Cr_{5.52}Nb_{3.38}P_{16.67}B_{3.03}$ and $Ni_{67.5}Cr_{10}Nb_3P_{16.5}B_3$

| Composition | G (GPa) | $\sigma_y$ (MPa) | $K_c$ (MPa m$^{1/2}$) | $r_p$ (mm) | $T_g$ (° C.) | $T_x$ (° C.) | $T_L$ (° C.) |
|---|---|---|---|---|---|---|---|
| $Ni_{71.4}Cr_{5.52}Nb_{3.38}P_{16.67}B_{3.03}$ | 48.9 | 2375 | 94 | 0.5 | 393 | 435 | 890 |
| $Ni_{67.5}Cr_{10}Nb_3P_{16.5}B_3$ | 52.2 | 2446 | 38 | 0.08 | 395 | 443.5 | 907 |

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the disclosure. Accordingly, the above description should not be taken as limiting the scope of the disclosure.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of forming a multilayer of metallic glass, the method comprising
providing a base layer of the metallic glass formed of an alloy having thickness $d_o$, and initial temperature $T_o$, wherein the alloy has a critical cooling rate $R_c$ and a time to crystallize at different temperatures upon heating the metallic glass formed of the alloy $t_h(T)$;
selecting a thickness $d_i$ and initial temperature $T_i$ for a molten layer of the alloy such that:

(i) an interface temperature $T_s$ determined by the Half-Enthalpy criterion is at least as high as the glass transition temperature $T_g$ of the metallic glass formed of the alloy, (ii) a characteristic cooling rate of the molten layer given by $\alpha_i \pi^2 (T_i - T_s)/4d_i^2$, where ($\alpha_i = 3 \times 10^{-6}$ m²/s, is greater than Rc, and (iii) a characteristic time scale of the base layer given by $4d_o^2/\alpha_o \pi^2$, where $\alpha_o = 3 \times 10^{-6}$ m²/s, is shorter than $t_h(T)$ at the interface temperature $T_s$, depositing the molten layer with the thickness $d_i$ and initial temperature $T_i$ over the base layer forming a multilayer.

2. The method of claim 1, where the interface temperature $T_s$ is at least 25° C. higher than $T_g$.

3. The method of claim 1, where a characteristic time scale of the molten layer is given by $[(T_L - T_n)/(T_i - T_s)][4d_i^2/\alpha_i \pi^2]$, where $T_n$ is the crystallization nose temperature of the alloy, and where the characteristic time scale is shorter than the crystallization nose time of the alloy.

4. The method of claim 1, where $d_i$ is less than the thickness given by $(\pi/2)\sqrt{[\alpha_i t_{cn}(T_i - T_s)/0.2T_L]}$, where $T_L$ is the liquidus temperature and $t_{cn}$ the crystallization nose time of the alloy.

5. The method of claim 1, where $d_i$ is less than the critical casting thickness of the alloy.

6. The method of claim 1, where $d_o$ is less than the thickness given by $(\pi/2)\sqrt{[\alpha_o t_h(T_s)]}$, where $t_h(T_s)$ is the time to crystallize upon heating the metallic glass formed from the alloy at the interface temperature $T_s$.

7. The method of claim 1, where the metallic glass formed from the alloy has $\Delta T_x$ of at least 50 K.

8. The method of claim 1, where the metallic glass formed from the alloy has $\Delta T_x/\Delta T_L$ of at least 0.1.

9. A multilayer produced according to the method of claim 1.

10. The multilayer of claim 9, where the multilayer is substantially amorphous.

11. The multilayer of claim 10, where the bending stress of the multilayer substantially matches that of a monolithic metallic glass sample having substantially the same geometry.

12. The multilayer of claim 10, where the bending strain of the multilayer substantially matches that of a monolithic metallic glass sample having substantially the same geometry.

13. A method of forming a composite metallic glass multilayer comprising depositing a molten layer of a metallic-glass forming alloy of a first alloy composition over a metallic glass layer of a second alloy composition, where the first alloy composition and the second alloy composition are different, where the thickness $d_i$ and initial temperature $T_i$ of the molten layer and the thickness $d_o$ and initial temperature $T_o$ of the metallic glass layer produce an instantaneous interface temperature $T_s$ that is at least as high as the effective glass transition temperature $T_{g*}$, where the characteristic cooling rate in the molten layer given by $\alpha_i \pi^2 (T_i - T_s)/4d_i^2$, where $\alpha_i = 3 \times 10^{-6}$ m²/s, is greater than the critical cooling rate of the metallic glass forming alloy, where the characteristic time scale in the metallic glass layer following the deposition process given by $4d_o^2/\alpha_o \pi^2$, where $\alpha_o = 3 \times 10^{-6}$ m²/s, is shorter than the time for the metallic glass to crystallize at the interface temperature $T_s$, and where the effective glass transition temperature is given by $T_{g*} = 0.5(T_{g1} + T_{g2})$, where $T_{g1}$ and $T_{g2}$ are the glass transition temperatures of the first alloy composition and the second alloy composition, respectively.

14. The method of claim 13, where the difference between $T_{g1}$ and $T_{g2}$ is less than 50° C.

15. The method of claim 13, where the difference between $T_{L1}$ and $T_{L2}$ is less than 150° C., where $T_{L1}$ and $T_{L2}$ are the liquidus temperatures of the first alloy composition and the second alloy composition, respectively.

16. The method of claim 13, the difference between $T_{x1}$ and $T_{x2}$ is less than 50° C., where $T_{x1}$ and $T_{x2}$ are the crystallization temperatures of the first alloy composition and the second alloy composition, respectively.

17. A metallic glass multilayer composite comprising at least two bonded metallic glass layers, where at least two layers comprise different metallic glass alloy compositions, where the relative difference between the shear moduli of the metallic glass alloy compositions is at least 2%, and where the thickness of each layer does not exceed the plastic zone radius of the metallic glass alloy composition of the layer.

18. The metallic glass multilayer composite of claim 17, where the yield strength of the metallic glass multilayer composite is within 20% of the volumetric average between the yield strengths of the different metallic glass compositions.

19. The metallic glass multilayer composite of claim 18, where the fracture toughness of the metallic glass multilayer composite is higher than the fracture toughness of the metallic glass alloy composition having the lowest fracture toughness.

20. The metallic glass multilayer composite of claim 18, where the tensile ductility of the metallic glass multilayer composite is higher than the tensile ductility values of the metallic glass compositions.

21. The method of claim 1, wherein no crystallization occurs in the molten and base layers of the multilayer.

22. The method of claim 1, wherein the multilayer has a bending strength within 40% of the bending strength of a monolithic metallic glass formed of the alloy having substantially the same geometry.

* * * * *